a method by which a decoding device performs image decoding, according to the present invention, comprises the steps of: deriving an intra prediction mode of a current block; deriving neighboring samples including left neighboring samples and upper neighboring samples of the current block; deriving reference samples for prediction of a target sample among the neighboring samples on the basis of the position of the target sample of the current block and the prediction angle of the intra prediction mode; determining an interpolation filter for the target sample; and deriving the prediction sample of the target sample on the basis of the interpolation filter and the reference samples.

(12) United States Patent
Yoo et al.

(10) Patent No.: US 10,757,407 B2
(45) Date of Patent: Aug. 25, 2020

(54) METHOD AND DEVICE FOR PERFORMING IMAGE DECODING ON BASIS OF INTRA PREDICTION IN IMAGE CODING SYSTEM

(71) Applicant: LG ELECTRONICS INC., Seoul (KR)

(72) Inventors: Sunmi Yoo, Seoul (KR); Jaeho Lee, Seoul (KR); Jangwon Choi, Seoul (KR); Jungdong Seo, Seoul (KR); Jin Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/591,238

(22) Filed: Oct. 2, 2019

(65) Prior Publication Data

US 2020/0036970 A1   Jan. 30, 2020

Related U.S. Application Data

(63) Continuation of application No. PCT/KR2018/000226, filed on Jan. 5, 2018.

(Continued)

(51) Int. Cl.
*H04N 19/11* (2014.01)
*H04N 19/117* (2014.01)
(Continued)

(52) U.S. Cl.
CPC ........... *H04N 19/11* (2014.11); *H04N 19/117* (2014.11); *H04N 19/176* (2014.11); *H04N 19/82* (2014.11)

(58) Field of Classification Search
CPC .... H04N 19/11; H04N 19/176; H04N 19/117; H04N 19/82
See application file for complete search history.

(56) References Cited

U.S. PATENT DOCUMENTS

2012/0140821 A1   6/2012   Drugeon et al.
2013/0272623 A1\*  10/2013  Jeon ..................... H04N 19/593
                                              382/238

(Continued)

FOREIGN PATENT DOCUMENTS

KR   2015-0059145 A   5/2015
RU      2550539 C1    5/2015

(Continued)

OTHER PUBLICATIONS

Chen, J. et al.: "Algorithm Description of Joint Exploration Test Model 5 (JEM 5)", Joint Video Exploration Team (JVET) of ITU-T SG 16 WP 3 and ISO/IEC JTC 1/SS 29/WG 11, Jan. 12-20, 2017, JVET-E1001-v2, XP030150648.

*Primary Examiner* — Tracy Y. Li
(74) *Attorney, Agent, or Firm* — Dentons US LLP

(57) ABSTRACT

A method by which a decoding device performs image decoding, according to the present invention, comprises the steps of: deriving an intra prediction mode of a current block; deriving neighboring samples including left neighboring samples and upper neighboring samples of the current block; deriving reference samples for prediction of a target sample among the neighboring samples on the basis of the position of the target sample of the current block and the prediction angle of the intra prediction mode; determining an interpolation filter for the target sample; and deriving the prediction sample of the target sample on the basis of the interpolation filter and the reference samples.

8 Claims, 14 Drawing Sheets

Related U.S. Application Data

(60) Provisional application No. 62/512,737, filed on May 31, 2017.

(51) Int. Cl.
   *H04N 19/176*    (2014.01)
   *H04N 19/82*     (2014.01)

(56) References Cited

U.S. PATENT DOCUMENTS

| | | | |
|---|---|---|---|
| 2013/0301720 A1* | 11/2013 | Lee | H04N 19/157 |
| | | | 375/240.12 |
| 2016/0373741 A1* | 12/2016 | Zhao | H04N 19/70 |
| 2016/0373743 A1 | 12/2016 | Zhao et al. | |
| 2017/0150180 A1 | 5/2017 | Lin et al. | |
| 2017/0150183 A1 | 5/2017 | Zhang et al. | |
| 2017/0353719 A1* | 12/2017 | Liu | H04N 19/147 |
| 2019/0158827 A1* | 5/2019 | Sim | H04N 19/513 |

FOREIGN PATENT DOCUMENTS

| | | | |
|---|---|---|---|
| WO | 2016-072722 A1 | 12/2016 | |
| WO | 2017-018664 A1 | 2/2017 | |
| WO | 2017086823 A1 | 5/2017 | |

\* cited by examiner

METHOD AND DEVICE FOR PERFORMING IMAGE DECODING ON BASIS OF INTRA PREDICTION IN IMAGE CODING SYSTEM

CROSS-REFERENCE TO RELATED APPLICATIONS

Pursuant to 35 U.S.C. § 119(e), this application is a continuation of International Application PCT/KR2018/000226, with an international filing date of Jan. 5, 2018, which claims the benefit of U.S. Provisional Patent Application No. 62/512,737, filed on May 31, 2017, the contents of which are hereby incorporated by reference herein in its entirety.

BACKGROUND OF THE DISCLOSURE

Field of the Disclosure

The present disclosure relates to a video coding technique, and more particularly, to a video decoding method and device based on intra-prediction in an image coding system.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

The present disclosure provides a method and a device for increasing image coding efficiency.

The present disclosure also provides an intra-prediction method and device for selecting an interpolation filter for a target sample in a current block.

The present disclosure also provides a method and device for performing intra-prediction based on an interpolation filter for a selected target sample.

In an aspect, an video decoding method performed by a decoding device is provided. The method includes deriving an intra-prediction mode of a current block; deriving neighboring samples including left neighboring samples and upper neighboring samples of the current block; deriving reference samples for prediction of a target sample of the current block among the neighboring samples based on a position of the target sample and a prediction angle of the intra-prediction mode; determining an interpolation filter for the target sample; and deriving a prediction sample of the target sample based on the interpolation filter and the reference samples.

In another aspect, a decoding device for performing image decoding is provided. The decoding device includes: an entropy-decoder obtaining prediction information for a current block; and a predictor deriving an intra-prediction mode of the current block; deriving neighboring samples including left neighboring samples and upper neighboring samples of the current block, deriving reference samples for prediction of a target sample among the neighboring samples based on a position of the target sample of the current block and a prediction angle of the intra-prediction mode, determining an interpolation filter for the target sample, and deriving a prediction sample of the target sample based on the interpolation filter and the reference samples.

In another aspect, a video encoding method performed by an encoding device is provided. The method includes: determining an intra-prediction mode for a current block; deriving neighboring samples including left neighboring samples and upper neighboring samples of the current block; deriving reference samples for prediction of a target sample of the current block among the neighboring samples based on a position of the target sample and a prediction angle of the intra-prediction mode; determining an interpolation filter for the target sample; deriving a prediction sample of the target sample based on the interpolation filter and the reference samples; and generating prediction information for the current block, encoding the generated prediction information, and outputting the encoded prediction information.

In another aspect, a video encoding device is provided. The encoding device includes: a predictor determining an intra-prediction mode for a current block, deriving neighboring samples including left neighboring samples and upper neighboring samples of the current block, deriving reference samples for prediction of a target sample among the neighboring samples based on a position of the target sample of the current block and a prediction angle of the intra-prediction mode, determining an interpolation filter for the target sample, and deriving a prediction sample of the target sample based on the interpolation filter and the reference samples; and an entropy-encoder generating prediction information for the current block, encoding the generated prediction information, and outputting the encoded prediction information.

According to the present disclosure, prediction may be performed on a target sample based on an interpolation filter selected according to size information of a current block, information of a distance to a reference sample, and/or prediction mode information, whereby a reference sample at a fractional sample position for the target sample may be accurately generated to improve prediction accuracy for the current block and residual for the current block may be reduced to enhance coding efficiency.

According to the present disclosure, since an interpolation filter for the target sample may be selected based on the various conditions described above, the bit amount of information regarding selection of the interpolation filter, thereby improving prediction accuracy of the current block and improving coding efficiency of the current block.

DESCRIPTION OF EXEMPLARY EMBODIMENTS

Figure 1:
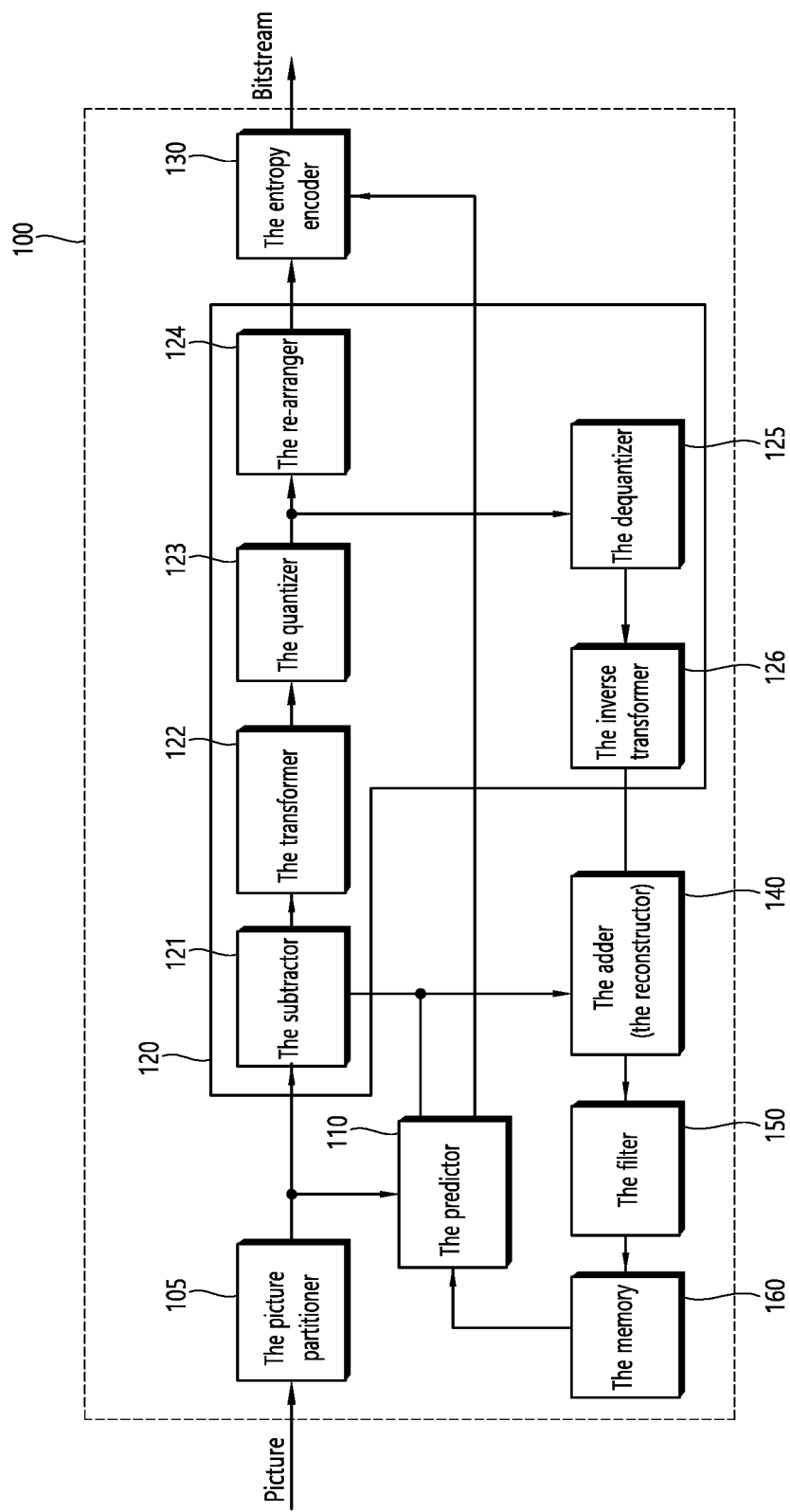
FIG. 1 is a schematic diagram illustrating a configuration of a video encoding device to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present disclosure is applicable.

Referring to FIG. 1, a video encoding device 100 may include a picture partitioner 105, a predictor 110, a residual processor 120, an adder 150, a filter 255, and a memory 160. The residual processor 120 may include a subtractor 121, a transformer 122, a quantizer 123, a re-arranger 124, a inverse-quantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure and/or a binary tree structure. In this case, for example, the quad tree structure may be first applied and the binary tree structure may be applied later. Alternatively, the binary tree structure may be applied first. The coding procedure according to the present disclosure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor 110 may perform prediction on a processing target block (hereinafter, a current block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transformation based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The inverse-quantizer 125 inverse-quantizes values (transform coefficients) quantized by the quantizer 123 and the inverse transformer 126 inversely transforms values inverse-quantized by the inverse-quantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
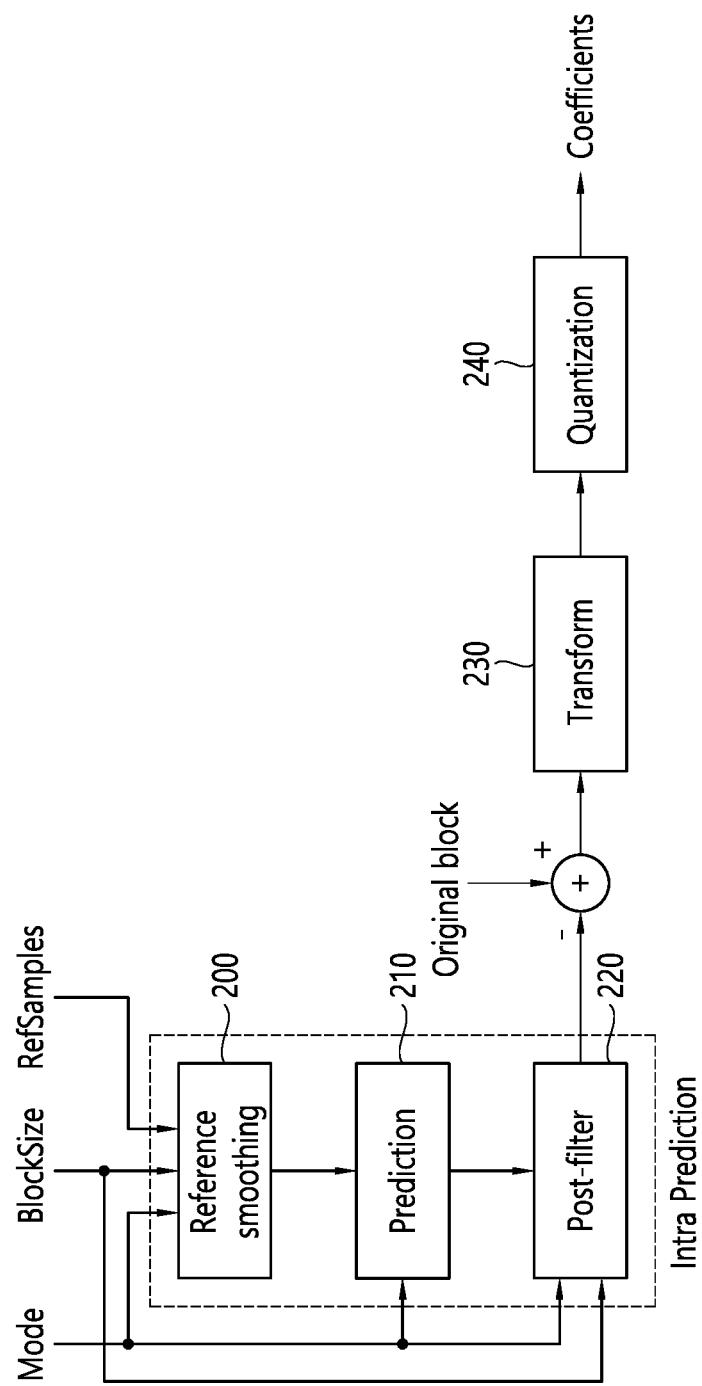
FIG. 2 illustrates another example of a video encoding device to which the present disclosure is applicable.

FIG. 2 illustrates another example of a video encoding device to which the present disclosure is applicable.

Referring to FIG. 2, the video encoding device includes an intra-predictor, a reference smoother 200, a predictor 210, a post-filter 220, a transformer 230, and a quantizer 240. Here, the intra-predictor may include a reference smoother 200, a predictor 210, and a post-filter 220.

When intra-prediction is applied to a current block, the reference smoother 200 may perform a smoothing process on left neighboring samples and upper neighboring samples used for intra-prediction of the current block in a picture (hereinafter, referred to as a current picture) to which the current block belongs, based on a size of the current block, intra-prediction mode information, and a sample value. Accordingly, it is possible to prevent visual artifacts regarding prediction samples of the current block, which may occur due to differences between sample values of the left neighboring samples and the upper neighboring samples.

The predictor 210 may (i) derive a prediction sample based on an average or interpolation of the left neighboring samples and the upper neighboring samples of the current block, or (ii) may derive the prediction samples based on neighboring samples present in a specific (prediction) direction regarding prediction samples among the left neighboring samples and the upper neighboring samples. The case (i) may be referred to as a non-directional mode or a non-angular mode and the case (ii) may be referred to as a directional mode or an angular mode. In intra-prediction, the prediction mode may have 33 directional prediction modes and at least two non-directional modes. The non-directional mode may include a DC prediction mode and a planar mode (Planar mode). The predictor 210 may also determine a prediction mode applied to the current block using a prediction mode applied to a neighboring block.

The post-filter unit 220 selectively may perform post-processing filtering to mitigate discontinuity between the current block and neighboring samples according to the prediction mode in which the prediction sample of the current block is derived. Thereafter, the encoding device may derive, as a residual sample, a difference between the prediction sample and an original sample, and the transformer 230 may transform the residual sample in units of blocks to generate transform coefficients Also, the quantizer 240 may quantize the transform coefficients to generate quantized transform coefficients.

Figure 3:
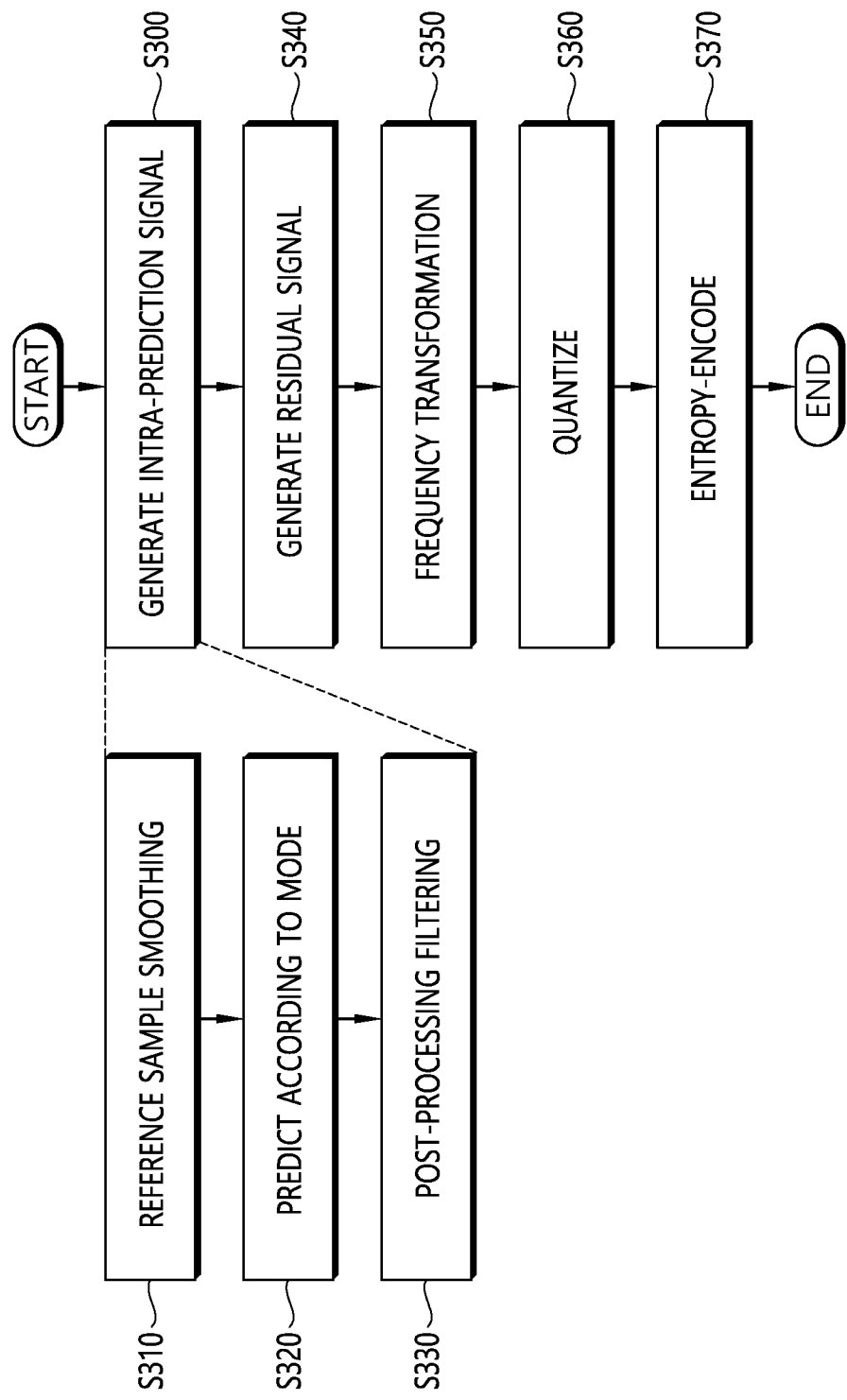
FIG. 3 illustrates an example of a process of performing intra-prediction in an encoding device.

FIG. 3 illustrates an example of a process of performing intra-prediction in the encoding device. The encoding device may perform intra-prediction to generate a prediction sample of a current block (S300). The prediction sample may be referred to as a prediction signal or an intra-prediction signal. Specifically, the encoding device may smooth (i.e., perform a smoothing process on) left neighboring samples and upper neighboring samples used for intra-prediction of the current block based on a size of the current block, mode information, and a sample value (S310). Thereafter, as described above, the encoding device may perform prediction according to the intra-prediction mode to generate the prediction sample (S320) and perform post-processing filtering to mitigate discontinuity between the current block and the neighboring samples (S330). The encoding device may generate, as a residual sample, a difference between the prediction sample and the original sample (S340) and transform the residual sample in units of blocks to generate transform coefficients. Further, the encoding device may quantize the transform coefficients to generate quantized transform coefficients (S360) and entropy-encode the quantized transform coefficients to perform signaling (S370).

Figure 4:
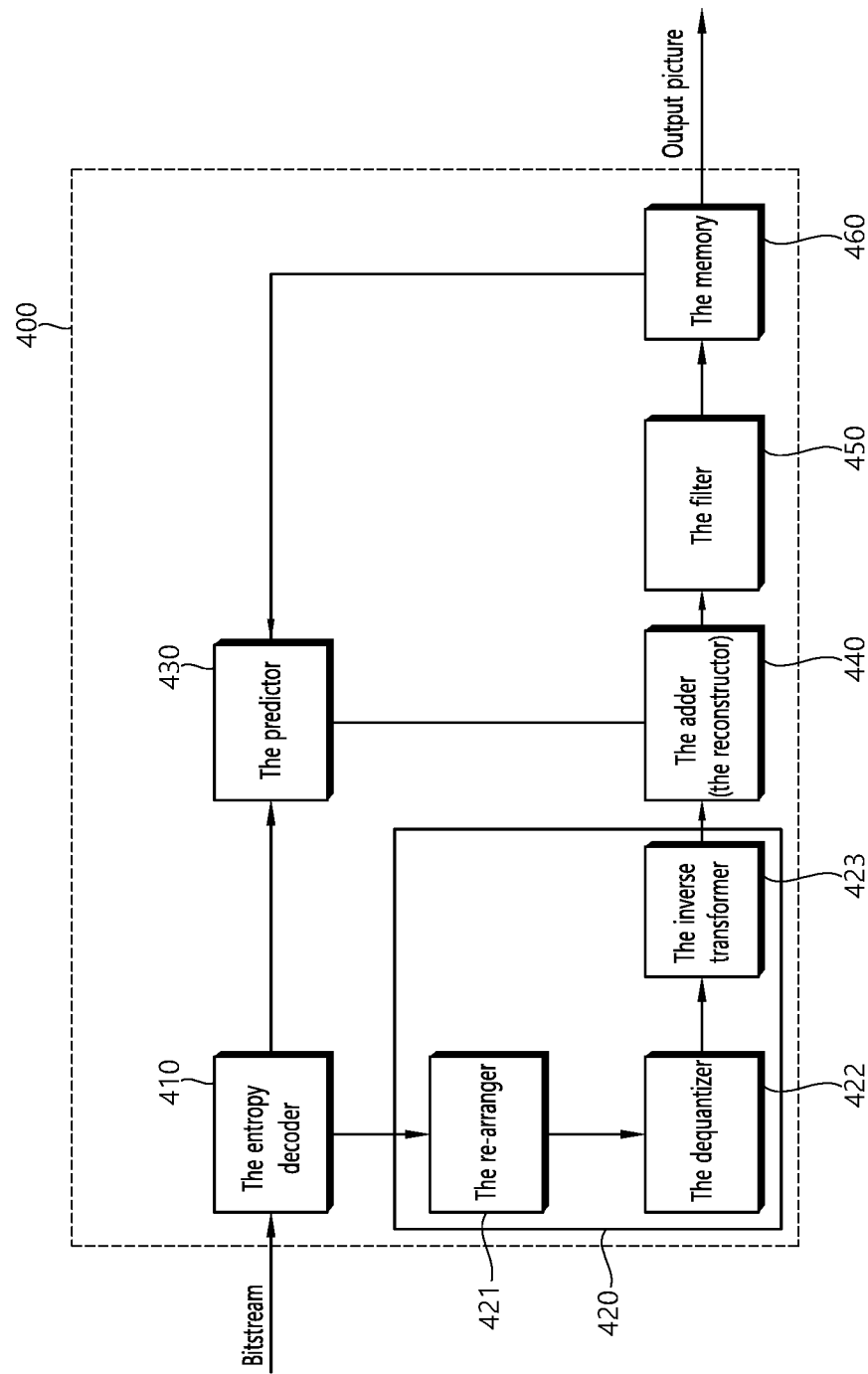
FIG. 4 is a schematic diagram illustrating a configuration of a video decoding device to which the present disclosure is applicable.

FIG. 4 briefly illustrates a structure of a video decoding device to which the present disclosure is applicable.

Referring to FIG. 4, a video decoding device 400 may include an entropy decoder 410, a residual processor 420, a predictor 430, an adder 440, a filter 450, and a memory 460. The residual processor 420 may include a re-arranger 421, a inverse-quantizer 422, an inverse transformer 423.

When a bitstream including video information is input, the video decoding device 400 may reconstruct a video in association with a process by which video information is processed in the video encoding device.

For example, the video decoding device 400 may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 410 may parse the bitstream to output information required for video reconstruction or picture reconstruction. For example, the entropy decoder 410 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 410 may be provided to the predictor 450 and residual values, that is, quantized transform coefficients, on which entropy decoding has been performed by the entropy decoder 410 may be input to the re-arranger 421.

The re-arranger 421 may rearrange the quantized transform coefficients into a two-dimensional block form. The re-arranger 421 may perform rearrangement corresponding to coefficient scanning performed by the encoding device.

Although the re-arranger 421 is described as a separate component, the re-arranger 421 may be a part of the inverse-quantizer 422.

The inverse-quantizer 422 may de-quantize the quantized transform coefficients based on a (de)quantization parameter to output a transform coefficient. In this case, information for deriving a quantization parameter may be signaled from the encoding device.

The inverse transformer 423 may inverse-transform the transform coefficients to derive residual samples.

The predictor 430 may perform prediction on a current block, and may generate a predicted block including prediction samples for the current block. A unit of prediction performed in the predictor 430 may be a coding block or may be a transform block or may be a prediction block.

The predictor 430 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 430 may derive a prediction sample for a current block based on a neighboring reference sample in a current picture. The predictor 430 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 430 may derive a prediction sample for a current block based on a sample specified in a reference picture according to a motion vector. The predictor 430 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 430 may construct a merge candidate list using motion information of available neighboring blocks and use information indicated by a merge index on the merge candidate list as a motion vector of the current block. The merge index may be signaled by the encoding device. Motion information may include a motion vector and a reference picture.

When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 430 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 430 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD may be obtained by subtracting the motion vector predictor from the motion vector of the current block. Here, the predictor 430 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 440 may add a residual sample to a prediction sample to reconstruct a current block or a current picture. The adder 440 may reconstruct the current picture by adding the residual sample to the prediction sample in units of a block. When the skip mode is applied, a residual is not transmitted and thus the prediction sample may become a reconstructed sample. Although the adder 440 is described as a separate component, the adder 440 may be a part of the predictor 430. Meanwhile, the adder 440 may be referred to as a reconstructor or reconstructed block generator.

The filter 450 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 460 may store a reconstructed picture (decoded picture) or information necessary for decoding. Here, the reconstructed picture may be the reconstructed picture filtered by the filter 450. For example, the memory 460 may store pictures used for inter-prediction. Here, the pictures used for inter-prediction may be designated according to a reference picture set or a reference picture list. A reconstructed picture may be used as a reference picture for other pictures. The memory 460 may output reconstructed pictures in an output order.

Figure 5:
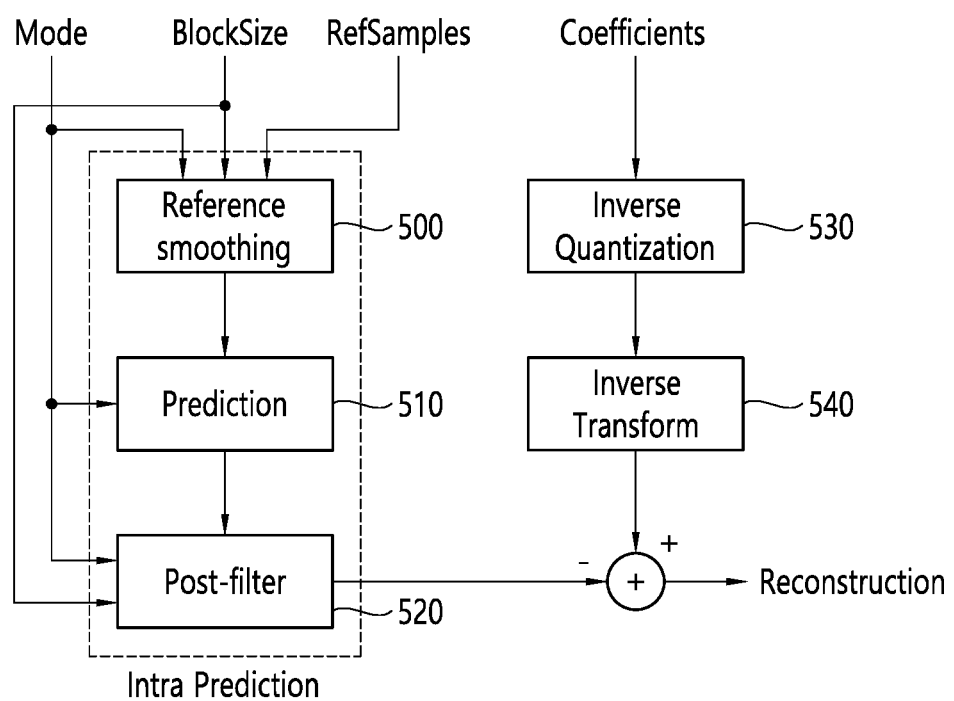
FIG. 5 illustrates another example of a video decoding device to which the present disclosure is applicable.

FIG. 5 illustrates another example of a video decoding device to which the present disclosure is applicable.

Referring to FIG. 5, the video encoding device includes an intra-predictor, a reference smoother 500, a predictor 810, a post-filter 520, an inverse-quantizer 530, and an inverse-transformer 540. Here, the intra-predictor may include the reference smoother 500, the predictor 510, and the post-filter 520. The intra-predictor may derive a prediction sample for a current block by applying a directional mode or a non-directional mode based on a neighboring reference sample of the current block. Here, the prediction mode to be applied to the current block may be determined using an intra-prediction mode of a neighboring block.

Specifically, when intra-prediction is applied to the current block, the reference smoother 500 may perform a smoothing process on the left neighboring samples and the upper neighboring samples used for intra-prediction of the current block in a picture (hereinafter, referred to as a current picture) to which the current block belongs, based on the size of the current block, the prediction mode, and the sample value. Thus, it is possible to prevent visual artifacts regarding the prediction samples of the current block, which may occur due to differences between sample values of the left neighboring samples and the upper neighboring samples.

The predictor 510 may derive the prediction sample based on an average or interpolation of the left neighboring samples and the upper neighboring samples of the current block (case (i)) or may derive the prediction sample based on a neighboring sample present in a specific (prediction) direction regarding the prediction sample among the left neighboring samples and the upper neighboring samples (case (ii)). The case (i) may be called a non-directional mode or a non-angular mode, and the case (ii) may be called a directional mode or an angular mode. In the intra-prediction, the prediction mode may include, for example, 33 directional prediction modes and at least two non-directional modes. The non-directional modes may include a DC prediction mode and a planar mode. The predictor 510 may determine the prediction mode to be applied to the current block using the prediction mode applied to the neighboring block.

The post-filter unit 520 may selectively perform post-processing filtering to mitigate discontinuity between the current block and the neighboring samples according to the prediction mode in which the prediction sample of the current block is derived. Thereafter, the inverse-quantizer 530 may inverse-quantize the quantized transform coefficients received from the encoding device, and the inverse-transformer 540 may inversely transform the inverse-quantized transform coefficients to generate residual samples in units of blocks. The decoding device may recover the current block encoded based on intra-prediction, based on the residual sample and the prediction sample.

Figure 6:
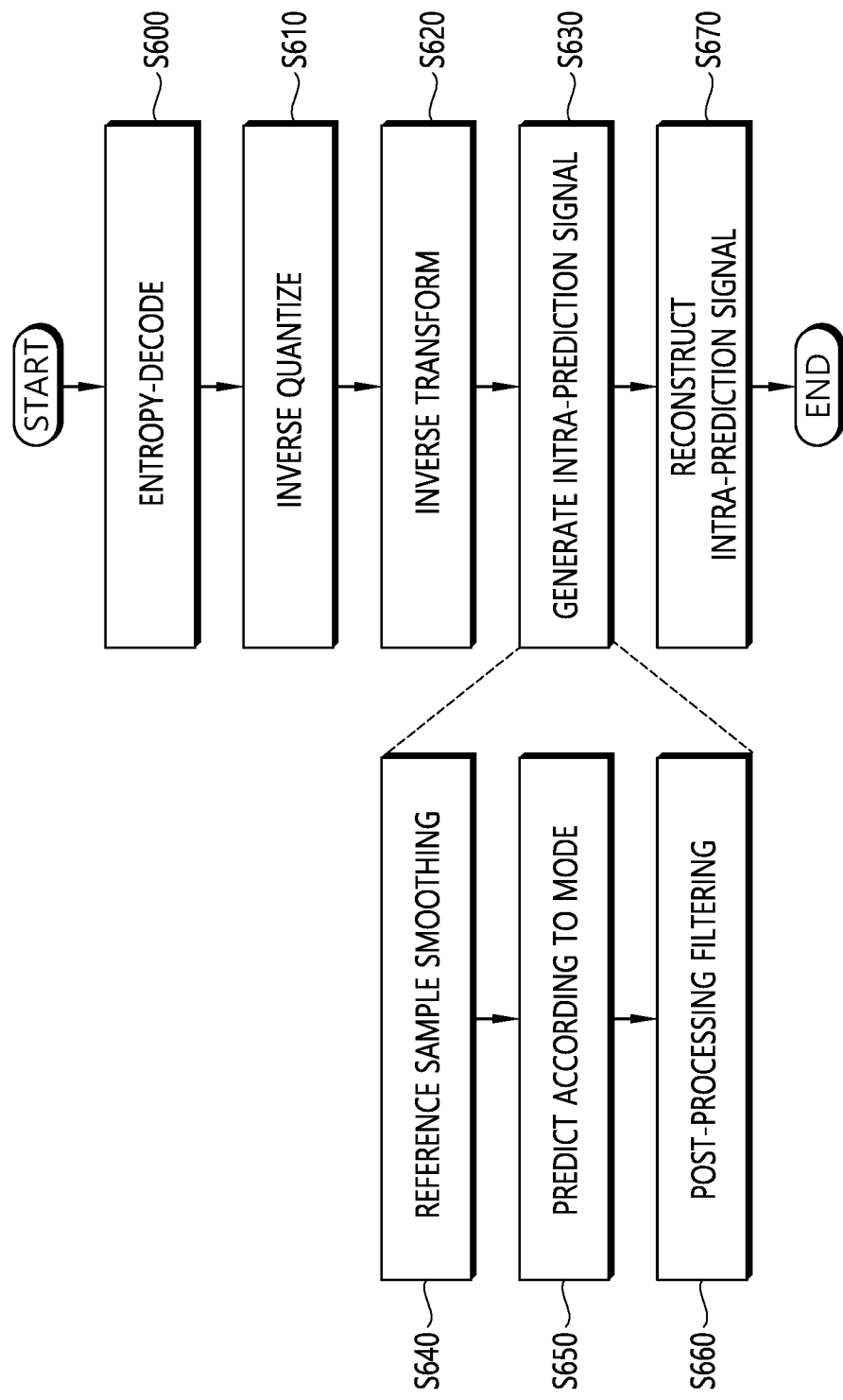
FIG. 6 illustrates an example of a process of performing intra-prediction in a decoding device.

FIG. 6 illustrates an example of a process of performing intra-prediction in a decoding device. The decoding device entropy-decodes entropy-encoded information received through a bitstream to obtain quantized transform coefficients (S600). Next, the decoding device may inverse-quantize the quantized transform coefficients to obtain transform coefficients (S610) and inversely-transform the transform coefficients to generate a residual sample in units of blocks (S620). Next, the decoding device may perform intra-prediction to generate a prediction sample of the current block (S630). The prediction sample may be referred to as a prediction signal or an intra-prediction signal. Specifically, the decoding device may perform a smoothing process on the left neighboring samples and the upper neighboring samples used for intra-prediction of the current block based on a size of the current block, a prediction mode, and sample value (S640). Thereafter, the decoding device may perform prediction according to the intra-prediction mode to generate the prediction sample as described above (S650) and perform post-processing filtering to reduce discontinuity between the current block and the neighboring samples (S660). The decoding device may add the prediction sample and the residual sample to generate a reconstructed sample of the current block (S670).

When prediction is performed on the current block as described above, the prediction may be performed based on the intra-prediction mode. For example, the intra-prediction may be performed based on a neighboring sample which has already been encoded/decoded at a decoding time of the current block. That is, the prediction sample of the current block may be reconstructed using the left neighboring samples and the upper neighboring samples of the current block. The left neighboring samples and the upper neighboring samples may be represented as shown in FIG. 7.

Figure 7:
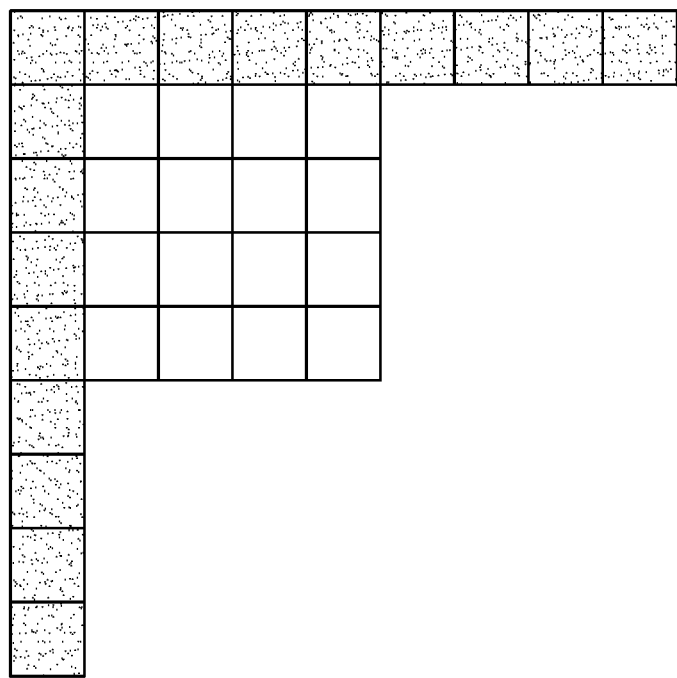
FIG. 7 illustrates an example of left neighboring samples and upper neighboring samples used for intra-prediction of the current block.

FIG. 7 illustrates an example of the left neighboring samples and upper neighboring samples used for intra-prediction of the current block. When intra-prediction is performed on the current block, an intra-prediction mode regarding the current block may be derived and a prediction sample regarding the current block may be generated using at least one of the left neighboring samples and the upper neighboring samples according to the intra-prediction mode. The left neighboring samples and the upper neighboring samples used for intra-prediction of the current block may undergo a smoothing process based on the size of the current block, the prediction mode, and the sample value. That is, filtering may be performed to reduce a difference between the sample values of the left neighboring samples and the upper neighboring samples based on the size of the current block, the prediction mode, and the sample values. Thus, it is possible to prevent visual artifacts regarding the prediction samples of the current block, which may occur due to differences between sample values of the left neighboring samples and the upper neighboring samples.

Here, the intra-prediction mode may include two non-directional intra-prediction modes and 33 directional intra-prediction modes. The non-directional intra-prediction modes may include a planar intra-prediction mode and a DC intra-prediction mode, and the directional intra-prediction modes may include intra-prediction modes #2 to #34. The planar intra-prediction mode may be referred to as a planar mode, and the DC intra-prediction mode may be referred to as a DC mode. The intra-prediction mode #10 may indicate a horizontal intra-prediction mode or a horizontal mode, the intra-prediction mode #26 indicates a vertical intra-prediction mode or a vertical mode, based on which a prediction direction of the directional intra-mode may be expressed by an angle. In other words, a relative angle corresponding to each intra-prediction mode may be expressed with reference to a horizontal reference angle 0° corresponding to the intra-prediction mode #10, and a relative angle corresponding to each intra-prediction mode may be expressed with reference to a vertical reference angle 0° corresponding to the intra-prediction mode #26.

In addition, demand for high-quality video is increasing, and in order to increase efficiency of a video codec, the number of directional intra-prediction directions may increase to 65. That is, the intra-prediction mode may include two non-directional intra-prediction modes and 65 directional intra-prediction modes. The non-directional intra-prediction modes may include a planar intra-prediction mode and a DC intra-prediction mode, and the directional intra-prediction modes may include intra-prediction modes #2 to #66.

Figure 8:
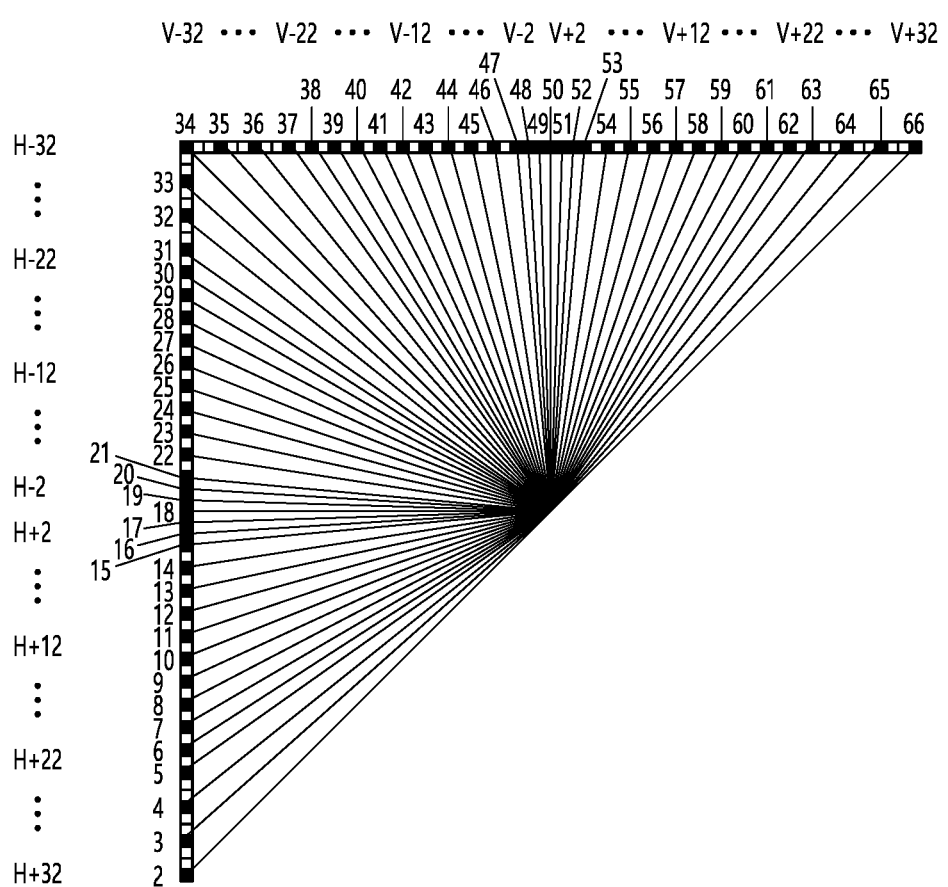
FIG. 8 illustrates an example of intra-directional modes of 65 prediction directions.

FIG. 8 illustrates intra-directional modes of 65 prediction directions.

Referring to FIG. 8, intra-prediction modes having horizontal directionality and intra-prediction modes having vertical directionality may be classified based on an intra-prediction mode #34 having an upper left diagonal prediction direction. H and V in FIG. 8 represent the horizontal directionality and the vertical directionality, respectively, and the numbers from −32 to 32 represent displacements of 1/32 unit on sample grid positions. The intra-prediction modes #2 to #33 have the horizontal directionality and the intra-prediction modes #34 to #66 have the vertical directionality. The intra-prediction mode #18 and the intra-prediction mode #50 represent a horizontal intra-prediction mode and a vertical intra-prediction mode, respectively, based on which a prediction direction of an angular intra-prediction mode may be expressed by an angle. In other words, a relative angle corresponding to each intra-prediction mode may be expressed based on a horizontal reference angle 0° corresponding to the intra-prediction mode #18, and a relative angle corresponding to each intra-prediction mode may be expressed based on a vertical reference angle 0° corresponding to the intra-prediction mode #50.

In case that the directional intra-prediction mode is applied to the current block, a prediction sample of the target sample may be derived based on a reference sample located in a prediction direction of the directional intra-prediction mode with respect to a target sample on which intra-prediction is performed in the current block. That is, the reference sample located in the prediction direction may be copied and derived as the prediction sample. Here, the reference sample may represent a neighboring sample located in a prediction direction of the directional intra-prediction mode with respect to the target sample among the upper neighboring samples and the left neighboring samples of the current block. Meanwhile, when there is no reference sample in units of integer samples in the prediction direction of the directional intra-prediction mode based the target sample, that is, when a position of a reference sample located in the prediction direction of the directional intra-prediction mode is a fractional sample position based on the target sample, a sample value of the reference sample may be derived through interpolation between integer samples adjacent to the left and right of the reference sample and the prediction sample of the target sample may be derived based on the reference sample. For example, interpolation between the integer samples may be performed based on a distance ratio of the reference sample and the integer samples.

Figure 9:
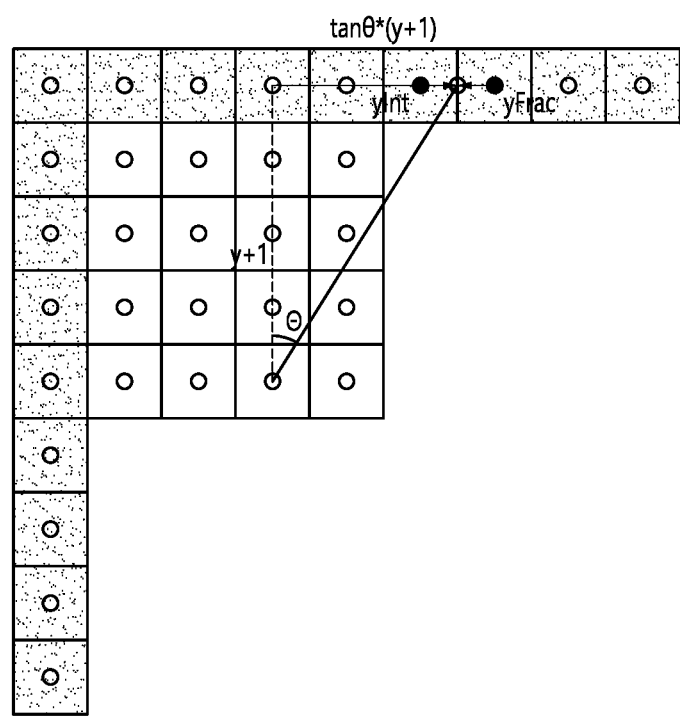
FIG. 9 illustrates an example in which prediction samples of a target sample are derived based on integer samples adjacent to the left and right of a reference sample when a position of the reference sample located in a prediction direction of the directional intra-prediction mode is a position of a fractional sample.

FIG. 9 is a view illustrating an example in which when a position of a reference sample located in a prediction direction of the directional intra-prediction mode is a fractional sample position, a prediction sample of the target sample is derived based on integer samples adjacent to the left and right of the reference sample.

Referring to FIG. 9, a fractional sample position of a reference sample located in a prediction direction of the directional intra-prediction mode based on the target sample may be derived as tan θ*(y+1). The tan θ value for each angle θ of each directional intra-prediction mode for calculating the fractional sample position may be scaled in advance in units of integers and defined in order to facilitate calculation. The tan θ values of the respective scaled directional intra-prediction modes may be derived as shown in the following table.

TABLE 1

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | — | 32 | 29 | 26 | 23 | 21 | 19 | 17 | 15 | 13 | 11 | 9 | 7 | 5 | 3 | 2 | 1 |
| predModeIntra | 18 | 19 | 20 | 21 | 22 | 23 | 24 | 25 | 26 | 27 | 28 | 29 | 30 | 31 | 32 | 33 | 34 |
| intraPredAngle | 0 | 1 | 2 | 3 | 5 | 7 | 9 | 11 | 13 | 15 | 17 | 19 | 21 | 23 | 26 | 29 | 32 |
| predModeIntra | 35 | 36 | 37 | 38 | 39 | 40 | 41 | 42 | 43 | 44 | 45 | 46 | 47 | 48 | 49 | 50 | 51 |
| intraPredAngle | 29 | 26 | 23 | 21 | 19 | 17 | 15 | 13 | 11 | 9 | 7 | 5 | 3 | 2 | 1 | 0 | 1 |
| predModeIntra | 52 | 53 | 54 | 55 | 56 | 57 | 58 | 59 | 60 | 61 | 62 | 63 | 64 | 65 | 66 | | |
| intraPredAngle | 2 | 3 | 5 | 7 | 9 | 11 | 13 | 15 | 17 | 19 | 21 | 23 | 26 | 29 | 32 | | |

Here, predModeIntra—may represent each directional intra-prediction mode, and intraPredAngle may represent a prediction angle of each directional intra-prediction mode or a scaled tan θ approximate value of each directional intra-prediction mode. The tan θ approximate value according to the predefined intra-prediction mode may6 be derived based on Table 1. Meanwhile, a $\tan^{-1}\theta$ value of each scaled directional intra-prediction mode may be derived as show in the following table.

TABLE 2

| predModeIntra | 19 | 20 | 21 | 22 | 23 | 24 | 25 | 26 |
|---|---|---|---|---|---|---|---|---|
| invAngle | −8192 | −4095 | −2731 | −1638 | −1170 | −910 | −745 | −630 |
| predModeIntra | 27 | 28 | 29 | 30 | 31 | 32 | 33 | 34 |
| invAngle | −546 | −482 | −431 | −390 | −356 | −315 | −282 | −256 |
| predModeIntra | 35 | 36 | 37 | 38 | 39 | 40 | 41 | 42 |
| invAngle | −282 | −315 | −356 | −390 | −431 | −482 | −546 | −630 |
| predModeIntra | 43 | 44 | 45 | 46 | 47 | 48 | 49 | |
| invAngle | −745 | −910 | −1170 | −1638 | −2731 | −4096 | −8192 | |

Here, predModeIntra—may represent each directional intra-prediction mode, intraPredAngle may represent an inverse prediction angle of each directional intra-prediction mode or the scaled $\tan^{-1}\theta$ approximate value of each directional intra-prediction mode. The tan$^{-1}$θ approximate value according to predefined intra-prediction mode based on Table 2 may be derived.

Meanwhile, the non-directional intra-prediction mode may be applied to the current block. The non-directional intra-prediction modes may include a planar intra-prediction mode and a DC intra-prediction mode. The planar intra-prediction mode may be referred to as a planar mode and the DC intra-prediction mode may be referred to as a DC mode. In the DC mode, a prediction sample of the current block may be derived based on an average value of neighboring samples of the current block. Intra-prediction based on the DC mode may be efficiently performed when the values of the samples of the current block are similar. Meanwhile, when intra-prediction is performed based on the DC mode when the values of the samples of the current block are varied, discontinuity may occur between a predicted block of the current block and neighboring samples. In a similar case, even when intra-prediction is performed based on the directional intra-prediction mode, unintentional visible contouring may occur. The planner mode has been devised to overcome this problem. The planar mode indicates a prediction mode in which horizontal linear prediction and vertical linear prediction are performed based on reference samples regarding the target sample and derived values are subsequently averaged to generate a prediction sample of the target sample.

When prediction is performed on the current block based on the directional intra-prediction mode, if the reference sample in units of the integer samples is not present in the prediction direction of the directional intra-prediction mode of the current block with respect to the target sample of the current block as described above, that is, when the position of the reference sample located in the prediction direction of the directional intra-prediction mode with respect to the target sample is the fractional sample position, a sample value of the reference sample may be derived through interpolation of left and right integer samples of the reference sample and the prediction sample of the target sample may be derived based on the derived reference sample. The integer samples may indicate neighboring samples of the integer sample position located near the reference sample.

In this case, interpolation between the integer samples on the left and right of the reference sample may be derived based on one of various interpolation filters. For example, interpolation may be performed based on an interpolation filter having a low-pass filter effect or the interpolation may be performed based on a sophisticated interpolation filter. The interpolation filter having the low-pass filter effect may represent a linear filter or a Gaussian filter, and the sophisticated interpolation filter may represent a spline filter. The spline filter may also be referred to as a cubic filter. The interpolation filters may be 4-tap interpolation filters. The 4-tap interpolation filter may represent a filter on which interpolation is performed for four integer samples based on four weights. Interpolation between the integer samples performed based on the interpolation filter may be expressed by the following equation.

$$p[x][y]=(f[0]*\text{ref}[x+ildx]+f[1]*\text{ref}[x+ildx+1]+f[2]*\text{ref}[x+ildx+2]+f[3]*\text{ref}[x+ildx+3]+128)>>8 \quad \text{[Equation 1]}$$

Here, p[x][y] may denote a prediction sample of the target sample, f[0], f[1], f[2] and f[3] may denote filter coefficients of the interpolation filter, ref[n] may denote the nth neighboring sample, and ildx may denote an integer index of the fractional sample position located in the prediction direction of the intra-prediction mode of the current block with respect to the target sample. The integer index of the fractional sample position may represent an integer value excluding the remainder of the fractional sample position.

Meanwhile, the filter coefficient of the cubic filter, which is one of the low-pass filters, and the filter coefficient of the Gaussian filter, which is one of the interpolation filters having a low-pass filter effect, may be derived as shown in the following table.

TABLE 3

| Sub-pel position n/32 | Cubic filter {f[0], f[1], f[2], f[3]} | Gaussian filter {f[0], f[1], f[2], f[3]} |
|---|---|---|
| n = 1 | {−3, 252, 8, −1} | {43, 161, 51, 1} |
| n = 2 | {−5, 247, 17, −3} | {40, 160, 54, 2} |
| n = 3 | {−7, 242, 25, −4} | {37, 159, 58, 2} |
| n = 4 | {−9, 236, 34, −5} | {34, 158, 62, 2} |
| n = 5 | {−10, 230, 43, −7} | {31, 156, 67, 2} |
| n = 6 | {−12, 224, 52, −8} | {28, 154, 71, 3} |
| n = 7 | {−13, 217, 61, −9} | {26, 151, 76, 3} |
| n = 8 | {−14, 210, 70, −10} | {23, 149, 80, 4} |
| n = 9 | {−15, 203, 79, −11} | {21, 146, 85, 4} |
| n = 10 | {−16, 195, 89, −12} | {19, 142, 90, 5} |
| n = 11 | {−16, 187, 98, −13} | {17, 139, 94, 6} |
| n = 12 | {−16, 179, 107, −14} | {16, 135, 99, 6} |
| n = 13 | {−16, 170, 116, −14} | {14, 131, 104, 7} |
| n = 14 | {−17, 162, 126, −15} | {13, 127, 108, 8} |
| n = 15 | {−16, 153, 135, −16} | {11, 123, 113, 9} |
| n = 16 | {−16, 144, 144, −16} | {10, 118, 118, 10} |
| n = 17 | {−16, 135, 153, −16} | {9, 113, 123, 11} |
| n = 18 | {−15, 126, 162, −17} | {8, 108, 127, 13} |
| n = 19 | {−14, 116, 170, −16} | {7, 104, 131, 14} |
| n = 20 | {−14, 107, 179, −16} | {6, 99, 135, 16} |
| n = 21 | {−13, 98, 187, −16} | {6, 94, 139, 17} |
| n = 22 | {−12, 89, 195, −16} | {5, 90, 142, 19} |
| n = 23 | {−11, 79, 203, −15} | {4, 85, 146, 21} |
| n = 24 | {−10, 70, 210, −14} | {4, 80, 149, 23} |
| n = 25 | {−9, 61, 217, −13} | {3, 76, 151, 26} |
| n = 26 | {−8, 52, 224, −12} | {3, 71, 154, 28} |
| n = 27 | {−7, 43, 230, −10} | {2, 67, 156, 31} |
| n = 28 | {−5, 34, 236, −9} | {2, 62, 158, 34} |
| n = 29 | {−4, 25, 242, −7} | {2, 58, 159, 37} |
| n = 30 | {−3, 17, 247, −5} | {2, 54, 160, 40} |
| n = 31 | {−1, 8, 252, −3} | {1, 51, 161, 43} |

Here, sub-pel position n/32 may represent a residual value of the fractional sample position located in the prediction direction of the intra-prediction mode of the current block with respect to the target sample. Based on the fractional sample position of the target sample and Table 3 above, filter coefficients of a cubic filter or filter coefficients of a Gaussian filter may be derived.

When prediction is performed on the current block based on the directional intra-prediction mode as described above, a distance between the target sample of the current block and the reference sample may increase according to a prediction angle of the directional intra-prediction mode, and as the distance increases, accuracy of prediction may deteriorate. A method of selecting an appropriate interpolation filter according to the distance between the target sample and the reference sample and performing prediction based on the reference sample derived by applying the selected interpolation filter to improve prediction accuracy may be proposed. The method of selecting an appropriate interpolation filter according to the distance between the target sample and the reference sample may be as follows.

For example, the interpolation filter may be selected based on the size of the current block or the intra-prediction mode of the current block. As described above, the distance between the target sample of the current block and the reference sample may be derived according to a slope of the prediction angle of the intra-prediction mode for the current block. Since the reference sample of the current block is derived based on the left neighboring samples and the upper neighboring samples of the current block, the distance between the target sample and the reference sample may increase as the position of the target sample is closer to a lower right end of the current block. Also, as the intraPredAngle value of the directional intra-prediction mode defined in Table 1 increases, the slope of the prediction angle may be close to 45°. As the slope of the prediction angle close to 45°, the distance between the target sample and the reference sample may increase, and accordingly, as the intraPredAngle value increases, the distance between the target sample and the reference sample may increase.

In addition, the distance between the target sample and the reference sample may be derived based on the size of the current block. That is, as the size of the current block increases, the distance between the target sample and the reference sample may increase. Therefore, the size of the current block is considered to be closely related to prediction accuracy of the target sample.

If the value of intraPredAngle is greater than 0 and smaller than 32 as described above, the target sample may be predicted based on the reference sample of the fractional sample position as shown in FIG. 9. In this case, since only an integer sample value near the fractional sample position is present, the coding device may predict the reference sample of the fractional sample location based on the interpolation filter, and the value of the reference sample of the predicted fractional sample position may be copied as a sample value of the prediction sample of the target sample. Thus, accuracy of the predicted block of the current block may be determined according to accuracy of the interpolation filter.

When intra-prediction is applied to the current block, the information which may be used for intra-prediction may be limited to the left neighboring samples and the upper neighboring samples of the current block that has already been reconstructed at the time of decoding the current block, and as the distance between the target sample of the current block and the reference sample increases, correlation between the target sample and the reference samples derived based on the left neighboring samples and the upper neighboring samples may be drastically reduced.

Accordingly, when the distance between the target sample and the reference sample is too long, the method of deriving the reference sample based on the interpolation filter having a low-pass filter effect so that artifacts or noise of the reference sample do not propagate may be used to enhance accuracy prediction and coding efficiency. Conversely, when the distance between the target sample and the reference sample is close to each other, correlation between the target sample and the reference sample is high, and thus, a method of deriving the reference sample based on accurate interpolation so that similarity between the prediction sample of the target sample and the reference sample is maintained to the greatest extent possible may be advantageously used. That is, when the distance between the target sample and the reference sample is close to each other, the method of deriving the reference sample based on a sophisticated interpolation filter may improve prediction accuracy and coding efficiency.

Therefore, the current block may be selected based on only the size of the current block for deriving a reference sample for the target sample of the current block, may be selected based only on the intra-prediction mode of the current block, or selected based on the intra-prediction mode of the current block.

For example, when the size of the current block is 4×4 size and intra-prediction is performed on the current block, correlation of the current block having the 4×4 size with neighboring samples of the current block may be very high, and thus, a reference sample may be derived based on the sophisticated interpolation filter regardless of intra-prediction mode. Alternatively, if the intraPredAngle value derived from the intra-prediction mode of the current block is 11 or greater irrespective of the size of the current block, the distance between the target sample and the reference sample may increase, and thus, the reference sample may be derived based on the interpolation filter having the interpolation filter effect. Alternatively, when the size of the current block is smaller than a specific size and the intraPredAngle value of the intra-prediction mode of the current block is smaller than a specific value, the reference sample of the target sample may be derived based on the sophisticated interpolation filter, and in other cases, the reference sample of the target sample may be derived based on the interpolation filter having a low-pass filter effect.

In addition, when a most probable mode (MPM) mode is applied to the current block to derive an intra-prediction mode of the current block based on an intra-prediction mode of a neighboring block of the current block and the intra-prediction mode of the current block is a directional intra-prediction mode, not the planar mode or the DC mode, the interpolation filter used in the neighboring block selected through the MPM mode may be derived as an interpolation filter of the current block. Here, in case that the MPM mode is applied to the current block, the coding device may determine an MPM list based on the intra-prediction mode regarding the left or upper neighboring blocks of the current block and determine the intra-prediction mode based on the MPM list.

In addition, when the interpolation filter is selected based on the intra-prediction mode of the current block, a reference of the intra-prediction mode, that is, a reference for determining whether the interpolation filter having the low-pass filter effect is used or whether the sophisticated interpolation filter is used may be varied according to sizes or forms of the current block.

In case that the current block is a square block, a width and height of the block are equal, that is, the size of the current block is N×N, and thus, a size of a reference block in selecting an interpolation filter may be N for a directional intra-prediction mode of any direction. Meanwhile, in case that the current block has a non-square shape, i.e., in case that the current block size is M×N, if a mode selected as the prediction mode of the current block is a directional intra-prediction mode and the mode is a vertical directional prediction mode, the size of the reference block for selecting an interpolation filter may be represented by M. Here, the vertical directional prediction mode may indicate intra-prediction modes #34 to #66 when the intra-prediction mode includes 65 directional intra-prediction modes and two non-directional intra-prediction modes. Similarly, when the size of the current block is M×N, the mode selected as the prediction mode of the current block is a directional mode and the mode is a horizontal directional prediction mode, the size of the current block serving as a reference for selecting an interpolation filter may be N. Here, the horizontal directional prediction mode may represent the intra-prediction modes #2 to #33 when the intra-prediction mode includes 65 directional intra-prediction modes and two non-directional intra-prediction modes.

Alternatively, if the current block is a non-square block having the M×N size and the prediction mode of the current block is the vertical directional prediction mode, the interpolation filter of the current block may be selected based on N, and similarly, if the current block is a non-square block having the M×N size and the prediction mode of the current block is the horizontal directional prediction mode, the interpolation filter of the current block may be selected based on M. However, in a specific example to be described later, when the vertical directional prediction mode is applied to the current block having the M×N size, the size of the current block serving as a reference for selecting the interpolation filter may be represented by M. Similarly, when the horizontal directional prediction mode is applied to the current block having the M×N size, the size of the current block serving as a reference for selecting the interpolation filter may be represented by N. Specifically, for example, if the size value of the block is smaller than or equal to 8, a sophisticated interpolation filter may be selected and a reference sample of the block may be derived based on the sophisticated interpolation filter, and in this case, if the size of the current block is 8×4 and the intra-prediction mode of the current block is one of the intra-prediction modes having vertical directionality, the sophisticated interpolation filter may be selected as the interpolation filter for the current block and the reference sample of the current block may be derived based on the sophisticated interpolation filter.

Also, if the intraPredAngle value of the intra-prediction mode of the current block is smaller than or equal to 11, a sophisticated interpolation filter is selected and a reference sample may be derived based on the sophisticated interpolation filter. If the intraPredAngle value of the intra-prediction mode of the current block is greater than 11, the interpolation filter having a low pass filter effect is selected and a reference sample may be derived based on the interpolation filter having the low pass filter effect.

In case that the value of the current block size is equal to or greater than 16, if the intraPredAngle value of the intra-prediction mode of the current block is smaller than or equal to 5, the sophisticated interpolation filter is selected and a reference sample may be derived based on the sophisticated interpolation filter. If the intraPredAngle value of the intra-prediction value of the current block is greater than 5, the interpolation filter having a low pass filter effect is selected and a reference sample may be derived based on the interpolation filter having the low pass filter effect.

Figure 10:
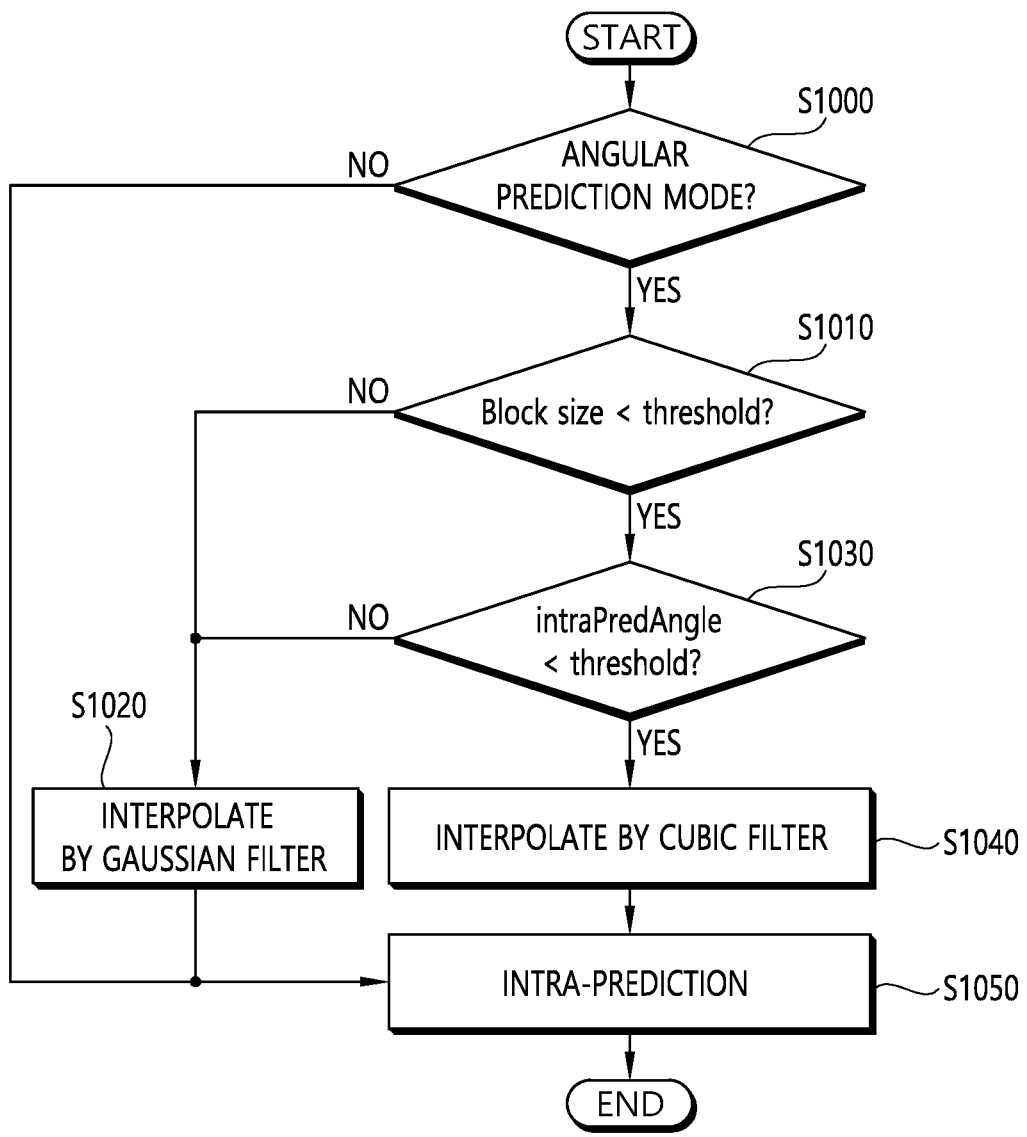
FIG. 10 illustrates an example of selecting an interpolation filter based on a size of the current block and an intra-prediction mode.

FIG. 10 illustrates an example of selecting an interpolation filter based on the size of the current block and the intra-prediction mode. The encoding device/decoding device may derive an intra-prediction mode for the current block and may determine whether the intra-prediction mode is a directional intra-prediction mode (S1000). The directional intra-prediction mode may be referred to as angular prediction. If the intra-prediction mode is a non-directional intra-prediction mode, the encoding/decoding device may perform intra-prediction of the current block based on the intra-prediction mode.

When the intra-prediction mode is the directional intra-prediction mode, the encoding device/decoding device may determine whether the size of the current block is smaller than a first threshold (S1010). When the current block is a non-square block having a M×N size and a mode selected as the intra-prediction mode of the current block includes an intra-prediction mode having vertical directionality, that is, when the intra-prediction mode includes 65 directional intra-prediction mode and two non-directional intra-prediction modes, if the intra-prediction mode of the current block is one of the intra-prediction modes #34 to #66, a reference for selecting an interpolation filter may be represented by a width of the current block, i.e., M. Similarly, in case that the current block is a non-square block having the M×N size and the mode selected as the intra-prediction mode of the current block is the intra-prediction mode having horizontal directionality, that is, when the intra-prediction mode includes 65 directional intra-prediction modes and two non-directional intra-prediction modes, if the intra-prediction mode of the current block is one of the intra-prediction modes #2 to #33, a reference for selecting the interpolation filter may be represented by a height of the current block, i.e., N. Alternatively, when only a block having a square shape is considered and the size of the current block is N×N, the value of the size of the current block may be represented by N. The first threshold may be set to 4, 8, 16, 32, or the like.

If the size of the current block is not smaller than the first threshold value, that is, if the size of the current block is greater than or equal to the first threshold value, the encoding device/decoding device may select a Gaussian filter as an interpolation filter of the current block and derive a reference sample of a target sample in the current block based on the Gaussian filter (S1020). Here, the Gaussian filter is one of interpolation filters having a low-pass filter effect, and a reference sample of the target sample may be derived based on an interpolation filter having a low-pass filter effect other than the Gaussian filter. For example, if the size of the current block is greater than or equal to the first threshold, the encoding device/decoding device may select the interpolation filter of the current block as a linear filter and derive a reference sample of the target sample in the current block based on the linear filter. Here, the reference sample may indicate a neighboring sample located in a prediction direction of a directional intra-prediction mode of the current block based on the target sample.

If the size of the current block is not smaller than the first threshold value, it may be determined whether intraPredAngle of the directional intra-prediction mode of the current block is smaller than a second threshold value (S1030). The intraPredAngle may indicate a prediction angle of the directional intra-prediction mode. For example, the second threshold may be set toll.

If intraPredAngle of the directional intra-prediction mode of the current block is not smaller than the second threshold value, the encoding device/decoding device may select the Gaussian filter as an interpolation filter of the current block and derive a reference sample of a target sample in the current block based on the Gaussian filter (S1020). Here, the Gaussian filter is one of interpolation filters having a low-pass filter effect as described above, and the reference sample of the target sample may be derived based on the interpolation filter having a low-pass filter effect other than the Gaussian filter.

If intraPredAngle of the directional intra-prediction mode of the current block is smaller than the second threshold value, the encoding device/decoding device may select a cubic filter as an interpolation filter of the current block and derive the reference sample of the target sample in the current block based on the cubic filter (S1040). Here, the cubic filter may be one of the sophisticated interpolation filters as described above, and the reference sample of the target sample may be derived based on a sophisticated interpolation filter other than the cubic filter. Further, the cubic filter may be called a spline filter.

The encoding device/decoding device may generate a prediction sample of the target sample based on the derived reference sample of the target sample (S1050). The encoding device/decoding device may generate the prediction sample by copying the reference sample. The reference sample may be copied and used as the prediction sample, and thus, it may be indicated that the prediction sample is generated based on the interpolation filter.

Meanwhile, in addition to the above-mentioned examples, a method of dividing the current block into arbitrary regions and selecting an interpolation filter for each region may be proposed as a method of selecting an interpolation filter.

For example, if the size of the current block is greater than or equal to a specific size, the current block may be divided into a plurality of regions and an interpolation filter of each region may be selected in consideration of a distance between each region and neighboring samples of the current block. A size of the divided regions of the current block may be a fixed value previously determined (i.e., previously set) between the encoding device and the decoding device or may be derived based on the size of the current block, the intra-prediction mode, and the like. For example, in case that the intra-prediction mode of the current block is an intra-prediction mode having vertical directionality and a mode number of the intra-prediction mode is greater than #34, the size of the divided regions of the current block may be derived as 4×4. In other words, in case that the intra-prediction mode of the current block is one of the intra-prediction modes #35 to #66, the size of the divided regions of the current block may be derived as 4×4. In case that the current block is a block having a size of 16×16, the current block may be divided into regions having a 4×4 size, the above-described sophisticated interpolation filter may be selected as the interpolation filter for regions from #0 to #7 on a raster scan order, and the interpolation filter having a low-pass filter effect may be selected as the interpolation filters for the other regions. Here, numbers of the 16 regions having the 4×4 size according to the raster scan order may be sequentially derived in order from an upper row to a lower row and sequentially derived in order from the left to the right in each row. That is, regions included in a first row among the 16 regions having the 4×4 size of the current block may be represented as region #0, region #1, region #2, and region #3 in order from the left to the right, regions included in the second row may be represented as region #4, region #5, region #6, and region #7 in order from the left to the right, regions included in the third row may be represented as region #8, region #9, region #10, and region #11 in order from the left and right, and regions included in the fourth row may be represented as region #12, region #13, region #14, and region #15 in order from the left to the right. Meanwhile, sizes of the divided regions of the current block and information indicating the interpolation filter for each of the regions may be signaled. In this case, the decoding device may divide the current block into a plurality of regions based on the information and select an interpolation filter of each region.

Alternatively, the interpolation filter may be selected based on a distance between a target sample of the current block and a reference sample. That is, the interpolation filter may be selected based on whether the distance between the target sample and the reference sample is equal to or greater than a specific threshold value. Here, the reference sample may indicate a neighboring sample located in a prediction direction of an intra-prediction mode of the current block based on the target sample.

For example, in case that the size of the current block is N×N, if the distance between the target sample of the current block and the reference sample is N/2 or greater, the reference sample may be derived based on the interpolation filter having a low-pass filter effect and the reference sample may be derived based on the sophisticated interpolation filter in other cases. The specific threshold value for selecting the interpolation filter may be derived based on the size of the current block as described above or may be derived based on the intra-prediction mode of the current block, whether the current block is a square block/non-square block, or the like. Alternatively, the information on the specific threshold value may be transmitted from the encoding device, and the decoding device may derive the specific threshold value of the current block based on the information on the received specific threshold value.

Figure 11:
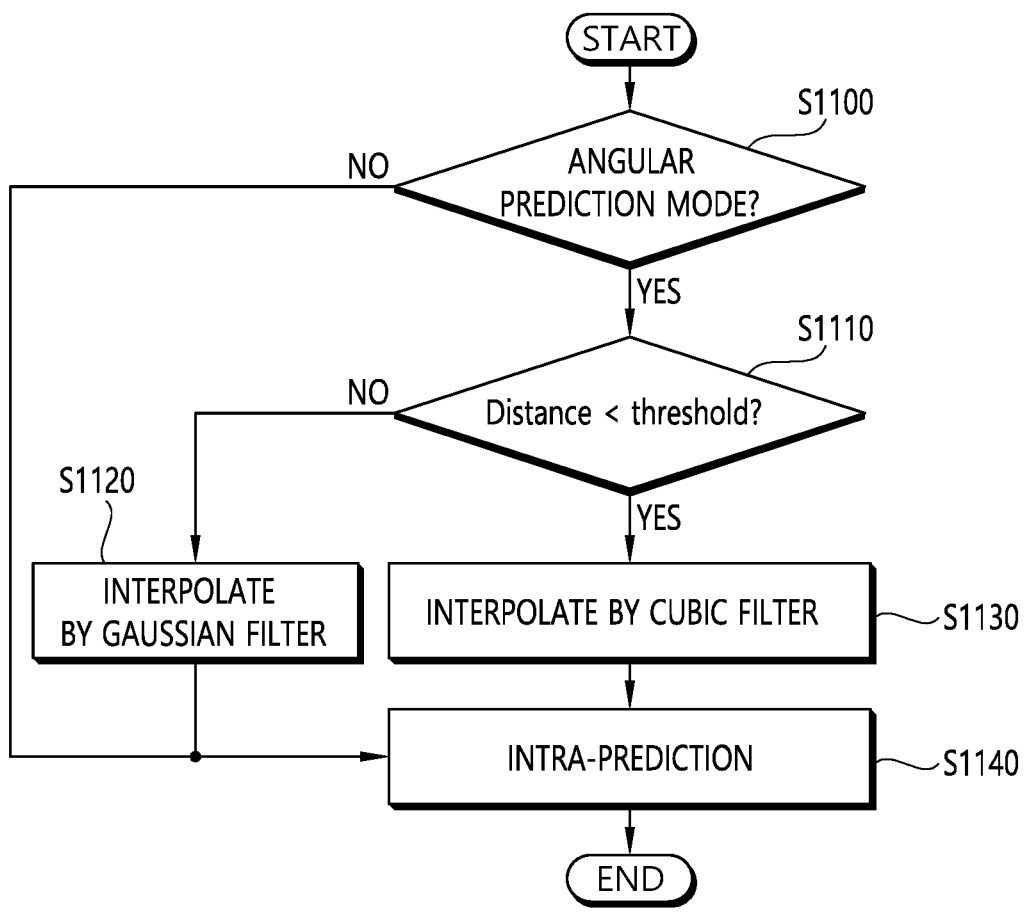
FIG. 11 illustrates an example of selecting an interpolation filter based on a distance between a target sample of the current block and a reference sample.

FIG. 11 illustrates an example of selecting an interpolation filter based on a distance between a target sample of a current block and a reference sample. The encoding device/decoding device may derive an intra-prediction mode for the current block and determine whether the intra-prediction mode is a directional intra-prediction mode (S1100). The directional intra-prediction mode may be referred to as angular prediction. If the intra-prediction mode is a non-directional intra-prediction mode, the encoding/decoding device may perform intra-prediction of the current block based on the intra-prediction mode.

If the intra-prediction mode is the directional intra-prediction mode, the encoding device/decoding device may determine whether a distance between the target sample of the current block and the reference sample is smaller than a threshold (S1110). The reference sample may represent a neighboring sample located in a prediction direction of the intra-prediction mode of the current block based on the target sample. Also, the threshold value may be derived based on the size of the current block, the intra-prediction mode of the current block, whether the block is a square/non-square block, and the like, as described above. In addition, information on the threshold value may be signaled, and the threshold value of the current block may be derived based on the information on the signaled threshold value.

If the distance between the target sample of the current block and the reference sample is not smaller than the threshold value, that is, if the distance between the target sample and the reference sample is greater than or equal to the threshold value, the encoding device/decoding device may select a Gaussian filter as an interpolation filter of the current block and derive a reference sample of the target sample in the current block based on the Gaussian filter (S1120). Here, the Gaussian filter is one of interpolation filters having a low-pass filter effect and the reference sample of the target sample may be derived based on an interpolation filter having a low-pass filter effect other than the Gaussian filter. For example, if the size of the current block is greater than or equal to the threshold value, the encoding device/decoding device may select the interpolation filter of the current block as a linear filter and derive the reference sample of the target sample in the current block based on the linear filter.

If the distance between the target sample of the current block and the reference sample is smaller than the threshold value, the encoding device/decoding device may select a cubic filter as an interpolation filter of the current block and derive the reference sample based on the cubic filter (S1130). Here, the cubic filter may be one of the sophisticated interpolation filters as described above, and the reference sample of the target sample may be derived based on a sophisticated interpolation filter other than the cubic filter. Further, the cubic filter may be called a spline filter.

The encoding device/decoding device may generate a prediction sample of the target sample based on the derived reference sample of the target sample (S1140). The encoding device/decoding device may generate the prediction sample by copying the reference sample. The reference sample may be copied and used as the prediction sample, and thus, it may be indicated that the prediction sample is generated based on the interpolation filter.

Also, as described above, one of the interpolation filters may be selected to derive a reference sample of the target sample, but a plurality of interpolation filters may also be used to derive the reference sample For example, when a reference sample position of the target sample of the current block is a fractional sample position, that is, when the reference sample of the target sample is a fractional sample, a first reference sample may be generated based on a first interpolation filter which is a sophisticated interpolation filter, a second reference sample may be generated based on a second interpolation filter which is an interpolation filter having the above-described low-pass filter effect, and a third reference sample may be generated based on a third interpolation filter which is an interpolation filter different from the first interpolation filter and the second interpolation filter. When the first reference sample, the second reference sample, and the third reference sample are generated, a prediction sample of the target sample may be generated based on the first reference sample, the second reference sample, and the third reference sample. For example, an average of the first reference sample and the second reference sample may be derived as a prediction sample of the target sample, an average of the first reference sample and the third reference sample may be derived as a prediction sample of the target sample, an average of the second reference sample and the third reference sample may be derived as a prediction sample of the target sample, or an average of the first reference sample, the second reference sample, and the third reference sample may be derived as a prediction sample of the target sample.

Alternatively, the prediction sample of the target sample may be derived through a weighted average of the first reference sample and the second reference sample, that is, a weighted sum of the first reference sample and the second reference sample. Alternatively, the prediction sample of the target sample may be derived through a weighted sum of the first reference sample and the third reference sample, through a weighted sum of the second reference sample and the third reference sample, or through a weighted sum of the first reference sample, the second reference sample, and the third reference sample. Alternatively, the prediction sample of the target sample may be derived through a weighted sum of the first reference sample, the second reference sample, and the third reference sample. The prediction sample of the target sample may be generated based on the above-described examples, and the combinations of the first reference sample, the second reference sample and/or the third reference sample other than the above-described examples.

Specifically, for example, the prediction sample of the target sample may be generated as follows. If a directional intra-prediction mode in which intra-prediction is performed based on a reference sample of a fractional sample position is performed on the current block, neighboring samples of the integer sample position may be interpolated based on the cubic filter so that a first reference sample may be derived, neighboring samples of the integer sample position may be interpolated based on the Gaussian filter so that a second reference sample of the target sample may be derived, and a prediction sample of the target sample may be generated based on the first reference sample and the second reference sample. Here, the directional intra-prediction mode in which intra-prediction is performed based on the reference sample of the fractional sample position may represent one of the directional intra-prediction modes excluding intra-prediction modes #2, #18, #34, #50 and #66. In addition, neighboring samples at the integer sample position may represent neighboring samples near a fractional sample position located in a prediction direction of a directional intra-prediction mode of the current block, based on the target sample among neighboring samples of the current block.

In another example, prediction accuracy of intra-prediction is higher as the distance between the target sample and the reference sample decreases, and thus, a method of deriving a first weight for a first reference sample generated based on the first interpolation filter which is a sophisticated interpolation filter and a second weight for a second reference sample generated based on a second interpolation filter which is an interpolation filter having a low pass filter effect, based on the distance between the target sample and the reference sample, and weighted-summing the first reference sample and the second reference sample based on the first weight and the second weight to generate a prediction sample of the target sample may be proposed. For example, the first weight may be derived to be in inverse proportion to the distance between the target sample and the reference sample, and the second weight may be derived as a value obtained by subtracting the first weight from 1. Alternatively, the first weight and the second weight used here may be up-scaled in units of integers to avoid a decimal point calculation. Accordingly, the first weight may be derived as a larger value as the distance between the target sample and the reference sample increases, and as the distance between the target sample and the reference sample increases, the first weight may be derived as a smaller value. The distance between the target sample and the reference sample may be calculated based on the prediction angle of the intra-prediction mode of the current block and the position of the target sample. Alternatively, a table for the size of the block and the intra-prediction mode may be stored and the distance between the target sample and the reference sample may be derived with reference to the table. Meanwhile, the method for deriving the reference sample of the target sample based on the plurality of interpolation filters disclosed in the above-described embodiments may be selectively applied. For example, whether to derive the reference sample of the target sample based on the plurality of interpolation filters may be derived based on the size of the current block, the intra-prediction mode of the current block, a variance of values of the neighboring samples of the current block, and the like. Alternatively, a flag indicating whether to drive the reference sample of the target sample based on the plurality of interpolation filters from the encoding device may be transmitted and whether to derive the reference sample of the target sample based on the plurality of interpolation filters may be determined based on the flag.

Figure 12:
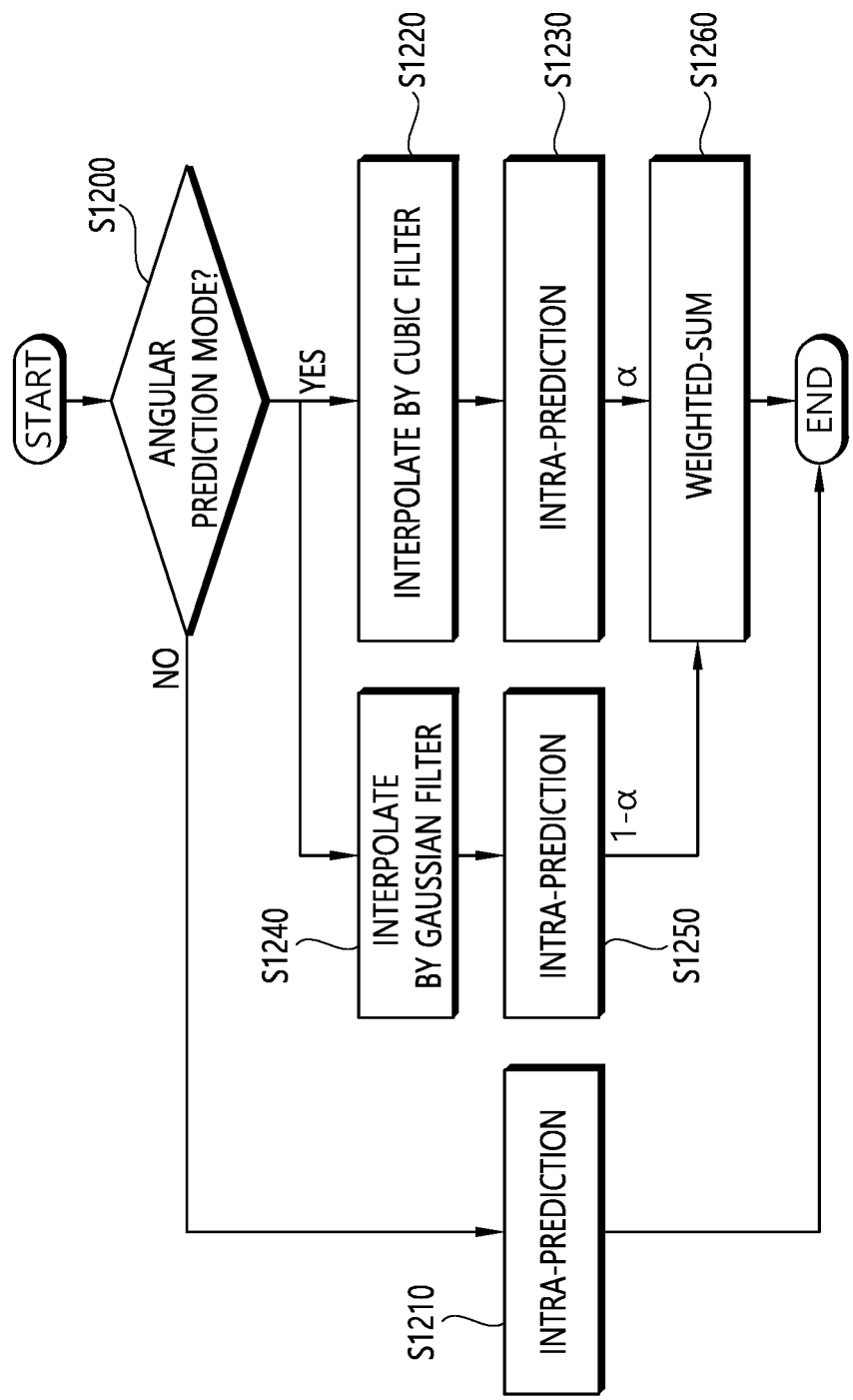
FIG. 12 illustrates an example of deriving a reference sample of a target sample of the current block based on the plurality of interpolation filters and deriving a prediction sample of the target sample based on the reference sample.

FIG. 12 illustrates an example of deriving a reference sample of a target sample of a current block based on a plurality of interpolation filters and deriving a prediction sample of the target sample based on the reference sample. The encoding device/decoding device may derive an intra-prediction mode for the current block and determine whether the intra-prediction mode is a directional intra-prediction mode (S1200). The directional intra-prediction mode may be referred to as an angular prediction.

If the intra-prediction mode is a non-directional intra-prediction mode, the encoding/decoding device may perform intra-prediction of the current block based on the non-directional intra-prediction mode (S1210).

When the intra-prediction mode is a directional intra-prediction mode, the encoding device/decoding device may interpolate neighboring samples at integer sample positions based on a cubic filter to derive a first reference sample of the target sample (S1220). Here, the neighboring samples of the integer sample positions may represent neighboring samples near a fractional sample position located in a prediction direction of the directional intra-prediction mode of the current block with respect to the target sample among the neighboring samples of the current block. The encoding device/decoding device may perform intra-prediction of the target sample based on the first reference sample (S1230). The encoding device/decoding device may generate a first temporary prediction sample by copying the first reference sample.

When the intra-prediction mode is a directional intra-prediction mode, the encoding device/decoding device interpolates neighboring samples of integer sample positions based on a Gaussian filter to derive a second reference sample of the target sample (S1240). The encoding device/ decoding device may perform intra-prediction of the target sample based on the second reference sample (S1240). The encoding device/decoding device may generate a second temporary prediction sample by copying the second reference sample.

The encoding device/decoding device may weighted-sum the first temporary prediction sample and the second temporary prediction sample to drive a prediction sample of the target sample (S1250). The prediction sample may be derived as the sum of a value obtained by multiplying a first weight a of the first temporary prediction sample to the first temporary prediction sample and a value obtained by multiplying 1-a of the second temporary prediction sample to the second temporary prediction sample. The first weight may be derived to be in inverse proportion to a distance between the target sample and the reference samples as described above, and the second weight may be derived as a value obtained by subtracting the first weight from the 1. Alternatively, the first weight and the second weight used herein may be up-scaled in units of integers and derived in order to avoid a decimal point calculation. The distance between the target sample and the reference samples may be calculated based on a prediction angle of the intra-prediction mode of the current block and a position of the target sample. Alternatively, a table regarding the size of the block and the intra-prediction mode may be stored in advance and the distance between the target sample and the reference samples may be derived with reference to the table.

Figure 13:
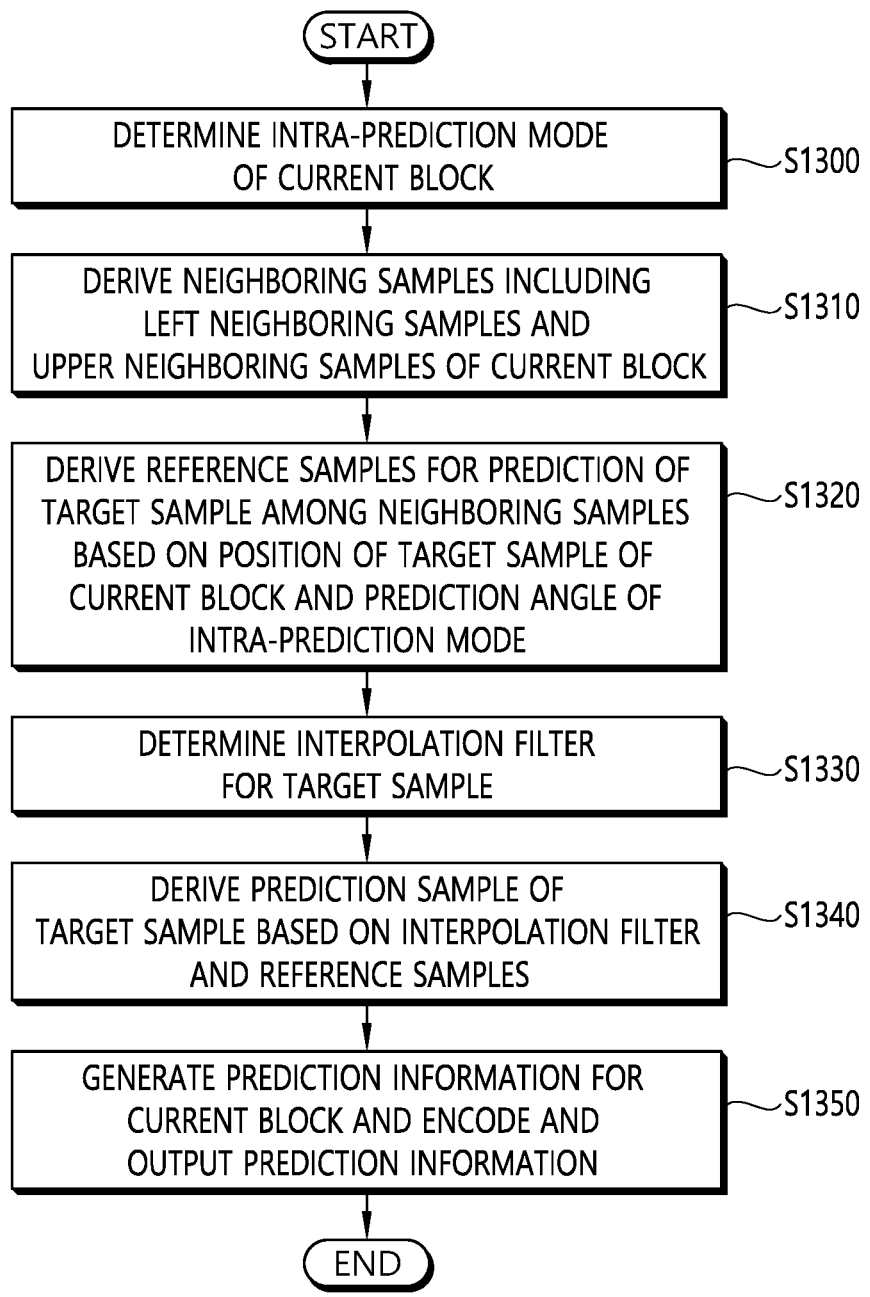
FIG. 13 schematically illustrates a video encoding method by an encoding device according to the present disclosure.

FIG. 13 schematically illustrates a video encoding method by an encoding device according to the present disclosure. The method disclosed in FIG. 13 may be performed by the encoding device disclosed in FIG. 1. Specifically, for example, steps S1300 to S1340 of FIG. 13 may be performed by the predictor of the encoding device and S1350 may be performed by the entropy encoder of the encoding device.

The encoding device determines an intra-prediction mode for the current block (S1300). The encoding device may perform various intra-prediction modes to derive an intra-prediction mode having an optimal RD cost as an intra-prediction mode for the current block. The intra-prediction mode may be one of two non-directional prediction modes and 33 directional prediction modes. As described above, the two non-directional prediction modes may include an intra-DC mode and an intra-planar mode. Alternatively, the intra-prediction mode may be one of two non-directional intra-prediction modes and 65 directional intra-prediction modes.

As described above, the two non-directional prediction modes may include an intra-DC mode and an intra-planar mode. In addition, the 65 directional intra-prediction modes may include vertical directional intra-prediction modes and horizontal directional intra-prediction modes. The vertical directional intra-prediction modes may include intra-prediction mode #34 to intra-prediction mode #66, and the horizontal directional intra-prediction modes may include intra-prediction mode #2 to intra-prediction mode #33.

The encoding device derives neighboring samples including left neighboring samples and upper neighboring samples of the current block (S1310). The encoding device may derive neighboring samples of the current block. The neighboring samples may include the left neighboring samples and the upper neighboring samples. In addition, the neighboring samples may include left upper samples. The left neighboring samples, the left upper neighboring sample, and the upper neighboring samples may be derived from neighboring blocks already reconstructed at the time of decoding the current block. 2N upper neighboring samples, left upper neighboring samples, and 2N left neighboring samples of the current block may be derived. If the size of the current block is N×N and an x component of a top-left sample of the current block is 0 and a y component thereof is 0, the left neighboring samples may be p[−1][0] to p[−1][2N−1], the left upper neighboring sample may be p[−1][−1], and the upper neighboring samples may be p[0][−1] to p[2N−1][−1].

Alternatively, when the size of the current block is M×N and the x component of the top-left sample of the current block is 0 and the y component thereof is 0, M+N upper neighboring samples, left upper neighboring samples, and M-N left neighboring samples of the current block may be derived. If the size of the current block has a non-square form of M×N and the x component of the top-left sample of the current block is 0 and they component thereof is 0, the left neighboring samples may be p[−1][0] to p[−1][M+N−1], the left upper neighboring sample may be p[−1][−1], and the upper neighboring samples may be p[0][−1] to p[M+N−1][−1].

The encoding device derives reference samples for prediction of the target sample among the neighboring samples based on the position of the target sample of the current block and the prediction angle of the intra-prediction mode (S1320). The encoding device may derive the position of the reference sample with respect to the target sample based on the position of the target sample of the current block and the prediction angle of the intra-prediction mode, and when the position of the reference sample is a fractional sample position, the encoding device may derive neighboring samples located near the position derived based on the position of the target sample of the current block and the prediction angle of the intra-prediction mode as the reference samples of the target sample. That is, the encoding device may derive a plurality of neighboring samples as the reference samples of the target sample based on the position of the target sample of the current block and the prediction angle of the intra-prediction mode. For example, four neighboring samples may be derived as the reference samples of the target sample. Here, the target sample may represent a sample in a current block on which intra-prediction is performed. The prediction angle of the intra-prediction mode may be derived based on Table 1 described above, and intraPredAngle may be a variable indicating the prediction angle derived from the intra-prediction mode.

The encoding device determines an interpolation filter for the target sample (S1330). The encoding device may determine the interpolation filter for the target sample based on the size of the current block and/or the intra-prediction mode of the current block. Also, for example, the interpolation filter may be determined when the position of the reference sample is a fractional sample position, i. e., when a plurality of reference samples are derived.

For example, the interpolation filter for the target sample may be determined based on the size of the current block. For example, if the size of the current block is 4×4, a sophisticated interpolation filter may be determined as the interpolation filter for the target sample. Specifically, when the size of the current block is 4×4, a cubic filter may be determined as the interpolation filter for the target sample. The cubic filter is one of the sophisticated interpolation filters, and the cubic filter may be called a spline filter.

If the current block is a square block, the width and the height are equal to each other. That is, since the current block is a square block having the N×N size, a reference size (i.e., reference value) in selecting an interpolation filter may be N for a directional intra-prediction mode of any prediction direction. Meanwhile, if the current block is a non-square block, that is, if the current block is a non-square block having the M×N size, when the intra-prediction mode of the current block is an intra-prediction mode having vertical directionality, a size of a reference block (i.e., the reference value) for selecting an interpolation filter may be M. Similarly, if the current block is a non-square block having the M×N size and the intra-prediction mode of the current block is the intra-prediction mode having horizontal directionality, the size of the current block (i.e., the reference value) as a reference for selecting an interpolation filter may be N. Alternatively, conversely, if the current block is a non-square block having the M×N size and the intra-prediction mode of the current block is an intra-prediction mode having vertical directionality, the interpolation filter of the current block may be selected based on N, and similarly, if the current block is a non-square block having the M×N size and the intra-prediction mode of the current block is an intra-prediction mode having horizontal directionality, the interpolation filter of the current block may be selected based on M. However, in a specific example to be described later, when the intra-prediction mode having vertical directionality is applied to the current block having the M×N size, the size of the current block as a reference for selecting the interpolation filter may be represented by M, and similarly, if the intra-prediction mode having horizontal directionality is applied to the current block, the size of the current block may be represented by N. Here, when the intra-prediction mode includes 65 directional intra-prediction modes and two non-directional intra-prediction modes, the intra-prediction mode having vertical directionality may represent the intra-prediction modes #34 to #66 and the intra-prediction mode having horizontal directionality may represent the intra-prediction modes #2 to #33.

For example, it may be determined whether the size of the current block indicated by the shape of the current block and the directionality of the intra-prediction mode is smaller than a specific value. If the size of the current block is smaller than the specific value, a sophisticated interpolation filter may be determined as an interpolation filter for the target sample, and if the size of the current block is not smaller than the specific value, the interpolation filter having a low-pass filter effect may be determined as the interpolation filter for the target sample. Specifically, when the size of the current block is smaller than the specific value, the cubic filter may be determined as the interpolation filter for the target sample. If the size of the current block is not smaller than the specific value, the Gaussian filter may be determined as the interpolation filter for the target sample. Alternatively, when the size of the current block is not smaller than the specific value, a linear filter may be determined as the interpolation filter for the target sample. The interpolation filter having a low-pass filter effect may include the Gaussian filter and the linear filter. Here, the specific value may be set to 4, 8, 16, 32, or the like.

Specifically, when the width and height of the current block are equal (i.e., when the current block is a square block), it may be determined whether the width of the current block is smaller than a specific value, and when the width of the current block is smaller than the specific value, the interpolation filter for the target sample may be derived as a cubic filter for the target sample, and when the width of the current block is not smaller than the specific Value, the interpolation filter for the target sample may be derived as a Gaussian filter.

In addition, when the width and height of the current block are different (that is, when the current block is a non-square block) and the intra-prediction mode of the current block is a directional intra-prediction mode having vertical directionality, it may be determined whether the width of the current block is smaller than a specific value. When the width of the current block is smaller than the specific value, the interpolation filter for the target sample may be derived as a cubic filter, and when the width of the current block is not smaller than the specific value, the interpolation filter for the target sample may be derived as a Gaussian filter.

In addition, when the width and height of the current block are different (that is, when the current block is a non-square block) and the intra-prediction mode of the current block is a directional intra-prediction mode having horizontal directionality, it may be determined whether the height of the current block is smaller than a specific value. When the height of the current block is smaller than the specific value, the interpolation filter for the target sample may be derived as a cubic filter, and when the height of the current block is not smaller than the specific value, the interpolation filter for the target sample may be derived as a Gaussian filter.

In addition, when the width and height of the current block are different (that is, when the current block is a non-square block) and the intra-prediction mode of the current block is a directional intra-prediction mode having vertical directionality, it may be determined whether the height of the current block is smaller than a specific value. When the height of the current block is smaller than the specific value, the interpolation filter for the target sample may be derived as a cubic filter, and when the height of the current block is not smaller than the specific value, the interpolation filter for the target sample may be derived as a Gaussian filter.

In addition, when the width and height of the current block are different (that is, when the current block is a non-square block) and the intra-prediction mode of the current block is a directional intra-prediction mode having horizontal directionality, it may be determined whether the width of the current block is smaller than a specific value. When the width of the current block is smaller than the specific value, the interpolation filter for the target sample may be derived as a cubic filter, and when the width of the current block is not smaller than the specific value, the interpolation filter for the target sample may be derived as a Gaussian filter.

In another example, the interpolation filter for the target sample may be determined based on an intra-prediction mode of the current block.

For example, it may be determined whether the prediction angle of the intra-prediction mode of the current block is smaller than a specific value. If the prediction angle of the intra-prediction mode is smaller than the specific value, a sophisticated interpolation filter may be determined as the interpolation filter for the target sample, and if the prediction angle of the intra-prediction mode is not smaller than the specific value, the interpolation filter having a low-pass filter effect may be determined as the interpolation filter for the target sample. Specifically, when the prediction angle of the intra-prediction mode is smaller than the specific value, a cubic filter may be determined as the interpolation filter for the target sample, and when the prediction angle of the intra-prediction mode is not smaller than the specific value, a Gaussian filter may be determined as the interpolation filter for the target sample.

Alternatively, when the prediction angle of the intra-prediction mode is not smaller than the specific value, a linear filter may be determined as the interpolation filter for the target sample. The interpolation filter having a low-pass filter effect may include the Gaussian filter and the linear filter. Here, the specific value may be set to 4, 8, 16, 32, or the like. The prediction angle of the intra-prediction mode may be derived based on Table 1 described above and intraPredAngle may indicate the prediction angle of the intra-prediction mode. Also, for example, the specific value may be set to 11.

In another example, the interpolation filter for the target sample may be determined based on the size of the current block and the intra-prediction mode. If the current block is a square block, the width and the height are equal. If the current block is a square block, the width and the height are equal to each other. That is, since the current block is a square block having the N×N size, a reference size (i.e., reference value) in selecting an interpolation filter may be N for a directional intra-prediction mode of any prediction direction. Meanwhile, if the current block is a non-square block, that is, if the current block is a non-square block having the M×N size, when the intra-prediction mode of the current block is an intra-prediction mode having vertical directionality, a size of a reference block (i.e., the reference value) for selecting an interpolation filter may be M. Similarly, if the current block is a non-square block having the M×N size and the intra-prediction mode of the current block is the intra-prediction mode having horizontal directionality, the size of the current block (i.e., the reference value) as a reference for selecting an interpolation filter may be N. Alternatively, conversely, if the current block is a non-square block having the M×N size and the intra-prediction mode of the current block is an intra-prediction mode having vertical directionality, the interpolation filter of the current block may be selected based on N, and similarly, if the current block is a non-square block having the M×N size and the intra-prediction mode of the current block is an intra-prediction mode having horizontal directionality, the interpolation filter of the current block may be selected based on M. However, in a specific example to be described later, when the intra-prediction mode having vertical directionality is applied to the current block having the M×N size, the size of the current block as a reference for selecting the interpolation filter may be represented by M, and similarly, if the intra-prediction mode having horizontal directionality is applied to the current block, the size of the current block may be represented by N. Here, when the intra-prediction mode includes 65 directional intra-prediction modes and two non-directional intra-prediction modes, the intra-prediction mode having vertical directionality may represent the intra-prediction modes #34 to #66 and the intra-prediction mode having horizontal directionality may represent the intra-prediction modes #2 to #33.

For example, the encoding device may determine whether the size of the current block is smaller than a first specific value, and when the size of the current block is not smaller than the first specific value, the encoding device may determine an interpolation filter having a low pass filter effect as the interpolation filter for the target sample. Specifically, when the size of the current block is not smaller than the first specific value, the encoding device may determine a Gaussian filter as the interpolation filter. Alternatively, when the size of the current block is not smaller than the first specific value, the encoding device may determine a linear filter as the interpolation filter.

Specifically, when the width and height of the current block are equal to each other, the encoding device may determine whether the width of the current block is smaller than a first specific value. When the width of the current block is not smaller than the first specific value, the encoding device may determine the Gaussian filter or the linear filter as the interpolation filter for the target sample.

If the width and height of the current block are different from each other and the intra-prediction mode of the current block is a directional intra-prediction mode having vertical directionality, the encoding device may determine whether the width of the current block is smaller than the first specific value. When the width of the current block is not smaller than the first specific value, the encoding device may determine the Gaussian filter or the linear filter as the interpolation filter for the target sample.

If the width and height of the current block are different from each other and the intra-prediction mode of the current block is a directional intra-prediction mode having horizontal directionality, the encoding device may determine whether the height of the current block is smaller than the first specific value. When the height of the current block is not smaller than the first specific value, the encoding device may determine the Gaussian filter or the linear filter as the interpolation filter for the target sample.

If the width and height of the current block are different from each other and the intra-prediction mode of the current block is a directional intra-prediction mode having vertical directionality, the encoding device may determine whether the height of the current block is smaller than the first specific value. When the height of the current block is not smaller than the first specific value, the encoding device may determine the Gaussian filter or the linear filter as the interpolation filter for the target sample.

If the width and height of the current block are different from each other and the intra-prediction mode of the current block is a directional intra-prediction mode having horizontal directionality, the encoding device may determine whether the width of the current block is smaller than the first specific value. When the width of the current block is not smaller than the first specific value, the encoding device may determine the Gaussian filter or the linear filter as the interpolation filter for the target sample.

If the size of the current block is smaller than the first specific value, the encoding device may determine whether a prediction angle of the intra-prediction mode of the current block is smaller than a second specific value. If the prediction angle of the intra-prediction mode is smaller than a second specific value, the encoding device may determine a sophisticated interpolation filter as an interpolation filter for the target sample. Specifically, when the size of the current block is smaller than the first specific value, the encoding device may determine a cubic filter as the interpolation filter.

Specifically, when the width and the height of the current block are equal and the width of the current block is smaller than the first specific value, the encoding device may determine whether the prediction angle of the intra-prediction mode of the current block is smaller than the second specific value, and when the prediction angle of the intra-prediction mode is smaller than the second specific value, the encoding device may determine the cubic filter as the interpolation filter.

If the width and height of the current block are different from each other and the intra-prediction mode of the current block is a directional intra-prediction mode having vertical directionality, the encoding device may determine whether the width of the current block is smaller than the first specific value. If the width of the current block is smaller than the first specific value, the encoding device may determine whether a prediction angle of the intra-prediction mode of the current block is smaller than the second specific value. If the prediction angle of the intra-prediction mode is smaller than the second specific value, the encoding device may determine the cubic filter as the interpolation filter.1

If the width and height of the current block are different from each other and the intra-prediction mode of the current block is a directional intra-prediction mode having horizontal directionality, the encoding device may determine whether the height of the current block is smaller than the first specific value. If the height of the current block is smaller than the first specific value, the encoding device may determine whether the prediction angle of the intra-prediction mode of the current block is smaller than the second specific value have. If the prediction angle of the intra-prediction mode is smaller than the second specific value, the encoding device may determine the cubic filter as the interpolation filter.

If the width and height of the current block are different from each other and the intra-prediction mode of the current block is a directional intra-prediction mode having vertical directionality, the encoding device may determine whether the height of the current block is smaller than the first specific value. If the height of the current block is smaller than the first specific value, the encoding device may determine whether a prediction angle of the intra-prediction mode of the current block is smaller than the second specific value. If the prediction angle of the intra-prediction mode is smaller than the second specific value, the encoding device may determine the cubic filter as the interpolation filter.1

If the width and height of the current block are different from each other and the intra-prediction mode of the current block is a directional intra-prediction mode having horizontal directionality, the encoding device may determine whether the width of the current block is smaller than the first specific value. If the width of the current block is smaller than the first specific value, the encoding device may determine whether the prediction angle of the intra-prediction mode of the current block is smaller than the second specific value have. If the prediction angle of the intra-prediction mode is smaller than the second specific value, the encoding device may determine the cubic filter as the interpolation filter.

If the prediction angle of the intra-prediction mode is not smaller than the second specific value, the encoding device may determine the interpolation filter having a low-pass filter effect as the interpolation filter for the target sample. Specifically, if the prediction angle of the intra-prediction mode is not smaller than the second specific value, the encoding device may determine the Gaussian filter as the interpolation filter. Alternatively, if the prediction angle of the intra-prediction mode is not smaller than the second specific value, the encoding device may determine the linear filter as the interpolation filter.

Specifically, if the width and height of the current block are equal and the width of the current block is smaller than the first specific value, the encoding device may determine whether the prediction angle of the intra-prediction mode of the current block is smaller than the specific value, and if the prediction angle of the intra-prediction mode is not smaller than the second specific value, the encoding device may determine the Gaussian filter or the linear filter as the interpolation filter.

If the width and height of the current block are different from each other and the intra-prediction mode of the current block is a directional intra-prediction mode having vertical directionality, the encoding device may determine whether the width of the current block is smaller than the first specific value. If the width of the current block is smaller than the first specific value, the encoding device may determine whether a prediction angle of the intra-prediction mode of the current block is smaller than the second specific value. If the prediction angle of the intra-prediction mode is not smaller than the second specific value, the encoding device may determine the Gaussian filter or the linear filter as the interpolation filter.

If the width and height of the current block are different from each other and the intra-prediction mode of the current block is a directional intra-prediction mode having horizontal directionality, the encoding device may determine whether the height of the current block is smaller than the first specific value. If the height of the current block is smaller than the first specific value, the encoding device may determine whether the prediction angle of the intra-prediction mode of the current block is smaller than the second specific value have. If the prediction angle of the intra-prediction mode is not smaller than the second specific value, the encoding device may determine the Gaussian filter or the linear filter as the interpolation filter.

If the width and height of the current block are different from each other and the intra-prediction mode of the current block is a directional intra-prediction mode having vertical directionality, the encoding device may determine whether the height of the current block is smaller than the first specific value. If the height of the current block is smaller than the first specific value, the encoding device may determine whether a prediction angle of the intra-prediction mode of the current block is smaller than the second specific value. If the prediction angle of the intra-prediction mode is not smaller than the second specific value, the encoding device may determine the Gaussian filter or the linear filter as the interpolation filter.

If the width and height of the current block are different from each other and the intra-prediction mode of the current block is a directional intra-prediction mode having horizontal directionality, the encoding device may determine whether the width of the current block is smaller than the first specific value. If the width of the current block is smaller than the first specific value, the encoding device may determine whether the prediction angle of the intra-prediction mode of the current block is not smaller than the second specific value have. If the prediction angle of the intra-prediction mode is smaller than the second specific value, the encoding device may determine the Gaussian filter or the linear filter as the interpolation filter.

In another example, the current block may be divided into a plurality of regions, and an interpolation filter of each region may be determined based on a distance between each region and neighboring samples of the current block. In this case, the interpolation filter for the target sample may be derived as an interpolation filter of a region including the target sample. In addition, if the size of the current block is greater than or equal to a specific size, the current block may be divided into a plurality of regions. Specifically, interpolation filters for the regions closer to the neighboring samples of the current block than a specific value, among the regions, may be determined as sophisticated interpolation filters and interpolation filters for regions farther to the neighboring samples of the current block than the specific value, among the regions, may be determined as interpolation filters having a low pass filter effect.

Meanwhile, the size of the plurality of regions divided from the current block may be previously set. Alternatively, the size of the plurality of regions may be derived based on the size of the current block, an intra-prediction mode, or the like. For example, in case that the intra-prediction mode of the current block is one of the intra-prediction modes #35 to #66, the size of the divided regions of the current block may be derived as a 4×4 size. Here, if the current block is a block having a 16×16 size, the current block may be divided into regions having a 4×4 size, a sophisticated interpolation filter may be determined as the interpolation filter for regions from #0 to #7 on a raster scan order and the interpolation filter having a low-pass filter effect may be determined as the interpolation filters for the other regions. For example, interpolation filters for the regions #0 to #7 on the raster scan order, among the regions, may be determined as the cubic filters, and interpolation filters for the other regions may be determined as the Gaussian filters or linear filters. Here, numbers of the 16 regions having the 4×4 size according to the raster scan order may be sequentially derived in order from an upper row to a lower row and sequentially derived in order from the left to the right in each row. That is, regions included in a first row among the 16 regions having the 4×4 size of the current block may be represented as region #0, region #1, region #2, and region #3 in order from the left to the right, regions included in the second row may be represented as region #4, region #5, region #6, and region #7 in order from the left to the right, regions included in the third row may be represented as region #8, region #9, region #10, and region #11 in order from the left and right, and regions included in the fourth row may be represented as region #12, region #13, region #14, and region #15 in order from the left to the right. Meanwhile, sizes of the divided regions of the current block and information indicating the interpolation filter for each of the regions may be generated.

In another example, the interpolation filter for the target sample may be determined based on a distance between the target sample and the reference samples. The distance between the target sample and the reference samples may be derived based on the position of the target sample and the prediction angle of the intra-prediction mode of the current block. For example, the distance may be calculated based on the position of the target sample and a trigonometric function value (e.g., tan θ) according to the prediction angle of the intra-prediction mode. Alternatively, the distance may be derived based on a predefined table for the size of the block and the intra-prediction mode. Alternatively, the distance between the target sample and the reference samples may indicate a vertical distance or a horizontal distance. That is, the distance between the target sample and the reference samples may be derived based on the vertical distance or the distance between the target sample and the reference samples may be derived based on the horizontal distance. For example, if the distance between the target sample and the reference samples indicates a vertical distance, the distance may be derived based on a y component of the target sample. Also, if the distance between the target sample and the reference samples indicates a horizontal distance, the distance may be derived based on an x component of the target sample.

For example, the encoding device may derive the distance between the target sample and the reference samples and determine whether the distance is smaller than a specific value. If the distance is smaller than the specific value, the encoding device may determine a sophisticated interpolation filter as the interpolation filter for the target sample, and if the distance is not smaller than the specific value, the encoding device may determine the interpolation filter having a low pass filter effect as an interpolation filter for the target sample. Specifically, if the distance is smaller than the specific value, the encoding device may determine a cubic filter as the interpolation filter for the target sample, and if the distance is not smaller than the specific value, the encoding device may determine A Gaussian filter or a linear filter as the interpolation filter for the target sample. The specific value may be derived based on the size of the current block. Alternatively, the specific value may be derived based on the intra-prediction mode of the current block, whether the current block is a square/non-square block, or the like. For example, when the size of the current block is N×N, the specific value may be derived as N/2. Further, information on the specific value may be generated and entropy-encoded and transmitted.

In another example, a plurality of interpolation filters may be determined as the interpolations filter for the target sample. For example, the interpolation filters for the target sample may include one of sophisticated interpolation filters and one of interpolation filters having a low-pass filter effect. Alternatively, the interpolation filters for the target sample may include one of the sophisticated interpolation filters and two of the interpolation filters having a low-pass filter effect. Alternatively, the interpolation filters for the target sample may include two of sophisticated interpolation filters and one of interpolation filters having a low-pass filter effect. Specifically, the interpolation filters for the target sample may include a cubic filter and a Gaussian filter.

The encoding device derives a prediction sample of the target sample based on the interpolation filter and the reference samples (S1340). The encoding device may derive filter coefficients of the interpolation filter based on the position of the target sample and the prediction angle of the intra-prediction mode and derive the prediction sample of the target sample based on the filter coefficients and the reference samples. For example, four neighboring samples among the neighboring samples of the current block may be derived as the reference samples, and four filter coefficients of the interpolation filter may be derived. The encoding device may interpolate the reference samples based on the filter coefficients to derive the prediction sample. The prediction sample may be derived based on Equation 1 described above.

Further, when a plurality of interpolation filters are determined as the interpolation filters for the target sample, the encoding device may derive (temporary) prediction samples based on each interpolation filter and derive the prediction sample of the target sample based on the derived (temporary) prediction sample. For example, the prediction sample of the target sample may be derived by averaging the (temporal) prediction samples or may be derived by weighted-summing the (temporal) prediction samples. Meanwhile, whether a plurality of interpolation filters are determined as the interpolation filter for the target sample may be derived based on the size of the current block, an intra-prediction mode of the current block, a variance of neighboring sample values of the current block, and the like. In addition, a flag indicating whether a plurality of interpolation filters are determined as the interpolation filters for the target sample may be generated.

For example, the interpolation filters for the target sample may include a cubic filter and a Gaussian filter. In this case, the encoding device may derive filter coefficients of the cubic filter based on the position of the target sample and the prediction angle of the intra-prediction mode and may derive filter coefficients of the Gaussian filter based on the position of the target sample and the prediction angle of the intra-prediction mode. The encoding device may derive a first prediction sample for the target sample based on the filter coefficients of the cubic filter and the reference samples, derive a second prediction sample for the target sample based on the filter coefficients of the Gaussian filter and the reference samples, and derive the prediction sample of the target sample based on the first prediction sample and the second prediction sample. The prediction sample of the target sample may be derived by averaging the first prediction sample and the second prediction sample. Alternatively, the prediction sample of the target sample may be derived by weighted-summing the first prediction sample and the second prediction sample. In this case, a weight for the first prediction sample may be in inverse proportion to the distance between the target sample and the reference samples and a weight for the second prediction sample may be derived as a value obtained by subtracting the weight for the first prediction sample from 1. Alternatively, the first weight and the second weight used here may be up-scaled in units of integers and derived to avoid a decimal point calculation.

Also, for example, the interpolation filters for the target sample may include a cubic filter and a linear filter. In this case, the encoding device may derive filter coefficients of the cubic filter based on the position of the reference sample and may derive filter coefficients of the linear filter based on the position of the reference sample. The encoding device may derive a first prediction sample for the target sample based on the filter coefficients of the cubic filter and the reference samples, derive a second prediction sample for the target sample based on the filter coefficients of the linear filter and the reference samples, and derive the prediction sample of the target sample based on the first prediction sample and the second prediction sample. The prediction sample of the target sample may be derived by averaging the first prediction sample and the second prediction sample. Alternatively, the prediction sample of the target sample may be derived by weighted-summing the first prediction sample and the second prediction sample. In this case, a weight for the first prediction sample may be in inverse proportion to the distance between the target sample and the reference samples and a weight for the second prediction sample may be derived as a value obtained by subtracting the weight for the first prediction sample from 1. Alternatively, the first weight and the second weight used here may be up-scaled in units of integers and derived to avoid a decimal point calculation.

In another example, if an MPM (most probable mode) mode is applied to the current block to derive an intra-prediction mode of the current block based on an intra-prediction mode of a neighboring block of the current block and the intra-prediction mode of the current block is a directional intra-prediction mode, rather than a planar mode or a DC mode, an interpolation filter for the target sample may be determined based on the neighboring blocks selected through the neighboring MPM mode. That is, the interpolation filter used in the neighboring block may be derived as an interpolation filter for the target sample. If the MPM mode is applied to the current block, the encoding device may determine an MPM list based on an intra-prediction mode for a left or upper neighboring block of the current block and determine the intra-prediction mode based on the MPM list.

The encoding device generates prediction information for the current block, encodes the prediction information, and outputs the encoded prediction information (S1350). The encoding device may encode the prediction information for the current block and output the encoded information in the form of a bitstream. The prediction information may include information on the intra-prediction mode of the current block. The encoding device may generate information on the intra-prediction mode indicating the intra-prediction mode, encodes the intra-prediction mode information, and output the information in the form of a bitstream. The intra-prediction mode information may include information directly indicating an intra-prediction mode for the current block or may include information indicating any one candidate in an infra prediction mode candidate list derived based on an intra-prediction mode of a left or upper block of the current block. The intra-prediction mode candidate list may indicate the MPM list.

In addition, when the current block is divided into a plurality of regions, the prediction information may include information indicating a size of the divided regions of the current block and an interpolation filter of each region. In addition, when the interpolation filter for the target sample is selected based on the size of the current block, the intra-prediction mode of the current block, or the distance between the target sample and the reference samples, the prediction information may include information regarding the specific value used for selecting the interpolation filter for the target sample. When the interpolation filter is selected based on the size of the current block and the intra-prediction mode of the current block, the prediction information may include information regarding a first specific value and information regarding a second specific value. Also, the prediction information may include a flag indicating whether a plurality of interpolation filters are determined as the interpolation filters for the target sample. When the flag indicates that a plurality of interpolation filters are determined as the interpolation filters for the target sample, a prediction sample for the target sample may be derived based on the plurality of interpolation filters, and when the flag indicates that a plurality of interpolation filters are not determined as the interpolation filters for the target sample, a prediction sample for the target sample may not be derived based on the plurality of interpolation filters. For example, when a value of the flag is 1, the flag may indicate that a plurality of interpolation filters are determined as the interpolation filters for the target sample, and when the value of the flag is 0, the flag may indicate that a plurality of interpolation filters are not determined as the interpolation filters for the target sample. The prediction information may be signaled through a video parameter set (VPS), a sequence parameter set (SPS), a picture parameter set (PPS), or a slice segment header or may be signaled on a block basis.

Figure 14:
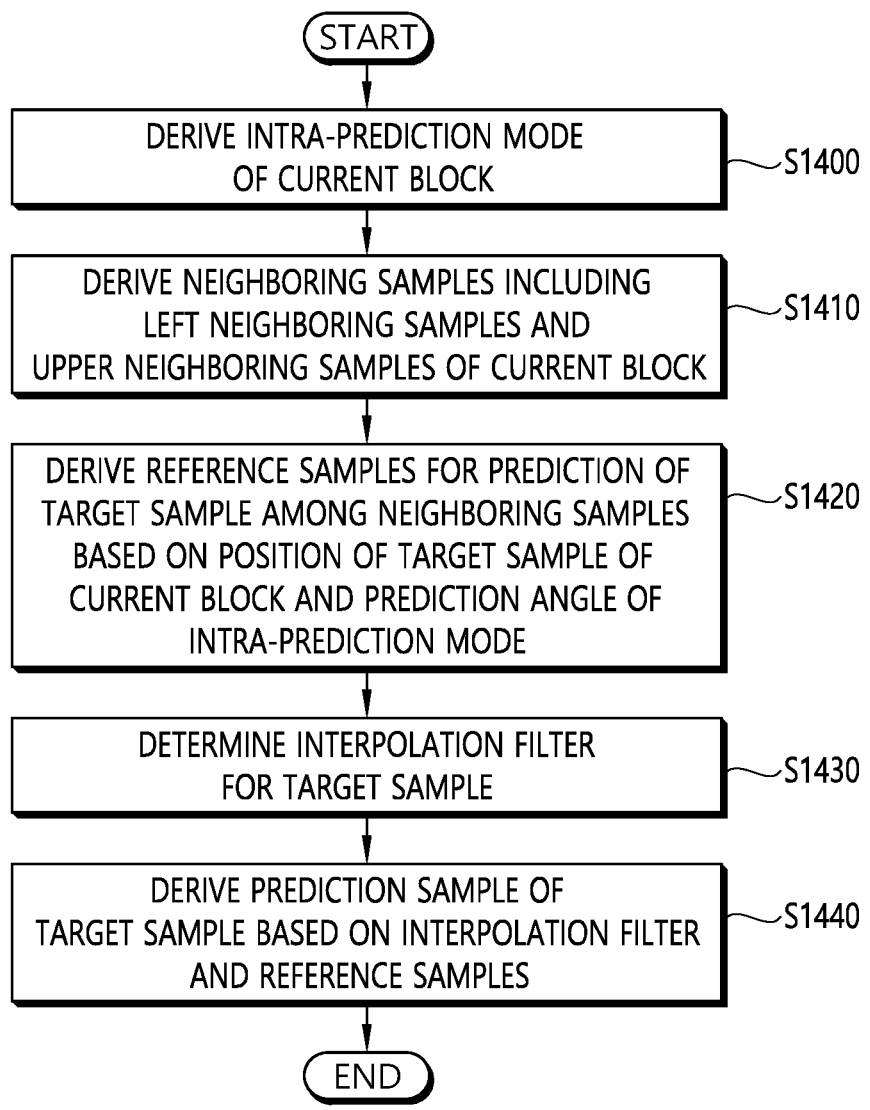
FIG. 14 schematically illustrates a video decoding method by a decoding device according to the present disclosure.

FIG. 14 schematically illustrates a video decoding method by a decoding device according to the present disclosure. The method disclosed in FIG. 14 may be performed by the decoding device disclosed in FIG. 4. Specifically, for example, steps S1400 to S1440 of FIG. 14 may be performed by the predictor of the decoding device.

The decoding device derives an intra-prediction mode for the current block (S1400). The decoding device may obtain prediction information on the current block through a bitstream. The prediction information may include information directly indicating an intra-prediction mode for the current block or include information indicating any 6 one of candidates on an intra-prediction mode candidate list derived based on an intra-prediction mode of a left or upper block of the current block. The intra-prediction mode candidate list may be referred to as an MPM candidate list. The decoding device may derive an intra-prediction mode for the current block based on the obtained prediction information. The intra-prediction mode may be one of two non-directional prediction modes and 33 directional prediction modes. As described above, the two non-directional prediction modes may include an intra-DC mode and an intra-planar mode. Alternatively, the intra-prediction mode may be one of two non-directional intra-prediction modes and 65 directional intra-prediction modes. As described above, the two non-directional prediction modes may include an intra-DC mode and an intra-planar mode. In addition, the 65 directional intra-prediction modes may include vertical directional intra-prediction modes and horizontal directional intra-prediction modes. The vertical directional intra-prediction modes may include intra-prediction mode #34 to intra-prediction mode #66, and the horizontal directional intra-prediction modes may include intra-prediction mode #2 to intra-prediction mode #33.

The decoding device derives neighboring samples including left neighboring samples and upper neighboring samples of the current block (S1410). The decoding device may derive neighboring samples of the current block. The neighboring samples may include the left neighboring samples and the upper neighboring samples. In addition, the neighboring samples may include left upper samples. The left neighboring samples, the left upper neighboring sample, and the upper neighboring samples may be derived from neighboring blocks already reconstructed at the time of decoding the current block. 2N upper neighboring samples, left upper neighboring samples, and 2N left neighboring samples of the current block may be derived. If the size of the current block is N×N and an x component of a top-left sample of the current block is 0 and a y component thereof is 0, the left neighboring samples may be p[−1][0] to p[−1][2N−1], the left upper neighboring sample may be p[−1][−1], and the upper neighboring samples may be p[0][−1] to p[2N−1][−1].

Alternatively, when the size of the current block is M×N and the x component of the top-left sample of the current block is 0 and the y component thereof is 0, M+N upper neighboring samples, left upper neighboring samples, and M−N left neighboring samples of the current block may be derived. If the size of the current block has a non-square form of M×N and the x component of the top-left sample of the current block is 0 and they component thereof is 0, the left neighboring samples may be p[−1][0] to p[−1][M+N−1], the left upper neighboring sample may be p[−1][−1], and the upper neighboring samples may be p[0][−1] to p[M+N−1][−1].

The decoding device derives reference samples for prediction of the target sample among the neighboring samples based on the position of the target sample of the current block and the prediction angle of the intra-prediction mode (S1420). The decoding device may derive the position of the reference sample with respect to the target sample based on the position of the target sample of the current block and the prediction angle of the intra-prediction mode, and when the position of the reference sample is a fractional sample position, the decoding device may derive neighboring samples located near the position derived based on the position of the target sample of the current block and the prediction angle of the intra-prediction mode as the reference samples of the target sample. That is, the decoding device may derive a plurality of neighboring samples as the reference samples of the target sample based on the position of the target sample of the current block and the prediction angle of the intra-prediction mode. For example, four neighboring samples may be derived as the reference samples of the target sample. Here, the target sample may represent a sample in a current block on which intra-prediction is performed. The prediction angle of the intra-prediction mode may be derived based on Table 1 described above, and intraPredAngle may be a variable indicating the prediction angle derived from the intra-prediction mode.

The decoding device determines an interpolation filter for the target sample (S1430). The decoding device may determine the interpolation filter for the target sample based on the size of the current block and/or the intra-prediction mode of the current block. Also, for example, the interpolation filter may be determined when the position of the reference sample is a fractional sample position.

For example, the interpolation filter for the target sample may be determined based on the size of the current block. For example, if the size of the current block is 4×4, a sophisticated interpolation filter may be determined as the interpolation filter for the target sample. Specifically, when the size of the current block is 4×4, a cubic filter may be determined as the interpolation filter for the target sample. The cubic filter is one of the sophisticated interpolation filters, and the cubic filter may be called a spline filter.

Also, if the current block is a square block, the width and the height are equal to each other. That is, since the current block is a square block having the N×N size, a reference size (i.e., reference value) in selecting an interpolation filter may be N for a directional intra-prediction mode of any prediction direction. Meanwhile, if the current block is a non-square block, that is, if the current block is a non-square block having the M×N size, when the intra-prediction mode of the current block is an intra-prediction mode having vertical directionality, a size of a reference block (i.e., the reference value) for selecting an interpolation filter may be M. Similarly, if the current block is a non-square block having the M×N size and the intra-prediction mode of the current block is the intra-prediction mode having horizontal directionality, the size of the current block (i.e., the reference value) as a reference for selecting an interpolation filter may be N. Alternatively, conversely, if the current block is a non-square block having the M×N size and the intra-prediction mode of the current block is an intra-prediction mode having vertical directionality, the interpolation filter of the current block may be selected based on N, and similarly, if the current block is a non-square block having the M×N size and the intra-prediction mode of the current block is an intra-prediction mode having horizontal directionality, the interpolation filter of the current block may be selected based on M. However, in a specific example to be described later, when the intra-prediction mode having vertical directionality is applied to the current block having the M×N size, the size of the current block as a reference for selecting the interpolation filter may be represented by M, and similarly, if the intra-prediction mode having horizontal directionality is applied to the current block, the size of the current block may be represented by N. Here, when the intra-prediction mode includes 65 directional intra-prediction modes and two non-directional intra-prediction modes, the intra-prediction mode having vertical directionality may represent the intra-prediction modes #34 to #66 and the intra-prediction mode having horizontal directionality may represent the intra-prediction modes #2 to #33.

Also, for example, it may be determined whether the size of the current block indicated by the shape of the current block and the directionality of the intra-prediction mode is smaller than a specific value. If the size of the current block is smaller than the specific value, a sophisticated interpolation filter may be determined as an interpolation filter for the target sample, and if the size of the current block is not smaller than the specific value, the interpolation filter having a low-pass filter effect may be determined as the interpolation filter for the target sample. Specifically, when the size of the current block is smaller than the specific value, the cubic filter may be determined as the interpolation filter for the target sample. If the size of the current block is not smaller than the specific value, the Gaussian filter may be determined as the interpolation filter for the target sample. Alternatively, when the size of the current block is not smaller than the specific value, a linear filter may be determined as the interpolation filter for the target sample. The interpolation filter having a low-pass filter effect may include the Gaussian filter and the linear filter. Here, the specific value may be set to 4, 8, 16, 32, or the like. Also, the prediction information for the current block may include information on the specific value. In this case, the specific value may be derived based on the information on the specific value.

Specifically, when the width and height of the current block are equal in size (i.e., when the current block is a square block), it may be determined whether the width of the current block is smaller than a specific value, and when the width of the current block is smaller than the specific value, the interpolation filter for the target sample may be derived as a cubic filter for the target sample, and when the width of the current block is not smaller than the specific Value, the interpolation filter for the target sample may be derived as a Gaussian filter.

In addition, when the width and height of the current block are different (that is, when the current block is a non-square block) and the intra-prediction mode of the current block is a directional intra-prediction mode having vertical directionality, it may be determined whether the width of the current block is smaller than a specific value. When the width of the current block is smaller than the specific value, the interpolation filter for the target sample may be derived as a cubic filter, and when the width of the current block is not smaller than the specific value, the interpolation filter for the target sample may be derived as a Gaussian filter.

In addition, when the width and height of the current block are different (that is, when the current block is a non-square block) and the intra-prediction mode of the current block is a directional intra-prediction mode having horizontal directionality, it may be determined whether the height of the current block is smaller than a specific value. When the height of the current block is smaller than the specific value, the interpolation filter for the target sample may be derived as a cubic filter, and when the height of the current block is not smaller than the specific value, the interpolation filter for the target sample may be derived as a Gaussian filter.

In addition, when the width and height of the current block are different (that is, when the current block is a non-square block) and the intra-prediction mode of the current block is a directional intra-prediction mode having vertical directionality, it may be determined whether the height of the current block is smaller than a specific value. When the height of the current block is smaller than the specific value, the interpolation filter for the target sample may be derived as a cubic filter, and when the height of the current block is not smaller than the specific value, the interpolation filter for the target sample may be derived as a Gaussian filter.

In addition, when the width and height of the current block are different (that is, when the current block is a non-square block) and the intra-prediction mode of the current block is a directional intra-prediction mode having horizontal directionality, it may be determined whether the width of the current block is smaller than a specific value. When the width of the current block is smaller than the specific value, the interpolation filter for the target sample may be derived as a cubic filter, and when the width of the current block is not smaller than the specific value, the interpolation filter for the target sample may be derived as a Gaussian filter.

In another example, the interpolation filter for the target sample may be determined based on an intra-prediction mode of the current block.

For example, it may be determined whether the prediction angle of the intra-prediction mode of the current block is smaller than a specific value. If the prediction angle of the intra-prediction mode is smaller than the specific value, a sophisticated interpolation filter may be determined as the interpolation filter for the target sample, and if the prediction angle of the intra-prediction mode is not smaller than the specific value, the interpolation filter having a low-pass filter effect may be determined as the interpolation filter for the target sample. Specifically, when the prediction angle of the intra-prediction mode is smaller than the specific value, a cubic filter may be determined as the interpolation filter for the target sample, and when the prediction angle of the intra-prediction mode is not smaller than the specific value, a Gaussian filter may be determined as the interpolation filter for the target sample. Alternatively, when the prediction angle of the intra-prediction mode is not smaller than the specific value, a linear filter may be determined as the interpolation filter for the target sample. The interpolation filter having a low-pass filter effect may include the Gaussian filter and the linear filter. Here, the specific value may be set to 4, 8, 16, 32, or the like. The prediction angle of the intra-prediction mode may be derived based on Table 1 described above and intraPredAngle may indicate the prediction angle of the intra-prediction mode. Also, for example, the specific value may be set to 11. Also, the prediction information for the current block may include information on the specific value. In this case, the specific value may be derived based on the information on the specific value.

In another example, the interpolation filter for the target sample may be determined based on the size of the current block and the intra-prediction mode.

For example, the decoding device may determine whether the size of the current block is smaller than a first specific value, and when the size of the current block is not smaller than the first specific value, the decoding device may determine an interpolation filter having a low pass filter effect as the interpolation filter for the target sample. Specifically, when the size of the current block is not smaller than the first specific value, the decoding device may determine a Gaussian filter as the interpolation filter. Alternatively, when the size of the current block is not smaller than the first specific value, the decoding device may determine a linear filter as the interpolation filter.

Specifically, when the width and height of the current block are equal to each other, the decoding device may determine whether the width of the current block is smaller than a first specific value. When the width of the current block is not smaller than the first specific value, the decoding device may determine the Gaussian filter or the linear filter as the interpolation filter for the target sample.

If the width and height of the current block are different from each other and the intra-prediction mode of the current block is a directional intra-prediction mode having vertical directionality, the decoding device may determine whether the width of the current block is smaller than the first specific value. When the width of the current block is not smaller than the first specific value, the decoding device may determine the Gaussian filter or the linear filter as the interpolation filter for the target sample.

If the width and height of the current block are different from each other and the intra-prediction mode of the current block is a directional intra-prediction mode having horizontal directionality, the decoding device may determine whether the height of the current block is smaller than the first specific value. When the height of the current block is not smaller than the first specific value, the decoding device may determine the Gaussian filter or the linear filter as the interpolation filter for the target sample.

If the width and height of the current block are different from each other and the intra-prediction mode of the current block is a directional intra-prediction mode having vertical directionality, the decoding device may determine whether the height of the current block is smaller than the first specific value. When the height of the current block is not smaller than the first specific value, the decoding device may determine the Gaussian filter or the linear filter as the interpolation filter for the target sample.

If the width and height of the current block are different from each other and the intra-prediction mode of the current block is a directional intra-prediction mode having horizontal directionality, the decoding device may determine whether the width of the current block is smaller than the first specific value. When the width of the current block is not smaller than the first specific value, the decoding device may determine the Gaussian filter or the linear filter as the interpolation filter for the target sample.

If the size of the current block is smaller than the first specific value, the decoding device may determine whether a prediction angle of the intra-prediction mode of the current block is smaller than a second specific value. If the prediction angle of the intra-prediction mode is smaller than a second specific value, the decoding device may determine a sophisticated interpolation filter as an interpolation filter for the target sample. Specifically, when the prediction angle of the intra-prediction mode is smaller than the second specific value, the decoding device may determine a cubic filter as the interpolation filter.

Specifically, when the width and the height of the current block are equal and the width of the current block is smaller than the first specific value, the decoding device may determine whether the prediction angle of the intra-prediction mode of the current block is smaller than the second specific value, and when the prediction angle of the intra-prediction mode is smaller than the second specific value, the decoding device may determine the cubic filter as the interpolation filter.

If the width and height of the current block are different from each other and the intra-prediction mode of the current block is a directional intra-prediction mode having vertical directionality, the decoding device may determine whether the width of the current block is smaller than the first specific value. If the width of the current block is smaller than the first specific value, the decoding device may determine whether a prediction angle of the intra-prediction mode of the current block is smaller than the second specific value. If the prediction angle of the intra-prediction mode is smaller than the second specific value, the decoding device may determine the cubic filter as the interpolation filter.

If the width and height of the current block are different from each other and the intra-prediction mode of the current block is a directional intra-prediction mode having horizontal directionality, the decoding device may determine whether the height of the current block is smaller than the first specific value. If the height of the current block is smaller than the first specific value, the decoding device may determine whether the prediction angle of the intra-prediction mode of the current block is smaller than the second specific value have. If the prediction angle of the intra-prediction mode is smaller than the second specific value, the decoding device may determine the cubic filter as the interpolation filter.

If the width and height of the current block are different from each other and the intra-prediction mode of the current block is a directional intra-prediction mode having vertical directionality, the decoding device may determine whether the height of the current block is smaller than the first specific value. If the height of the current block is smaller than the first specific value, the decoding device may determine whether a prediction angle of the intra-prediction mode of the current block is smaller than the second specific value. If the prediction angle of the intra-prediction mode is smaller than the second specific value, the decoding device may determine the cubic filter as the interpolation filter.

If the width and height of the current block are different from each other and the intra-prediction mode of the current block is a directional intra-prediction mode having horizontal directionality, the decoding device may determine whether the width of the current block is smaller than the first specific value. If the width of the current block is smaller than the first specific value, the decoding device may determine whether the prediction angle of the intra-prediction mode of the current block is smaller than the second specific value have. If the prediction angle of the intra-prediction mode is smaller than the second specific value, the decoding device may determine the cubic filter as the interpolation filter.

If the prediction angle of the intra-prediction mode is not smaller than the second specific value, the decoding device may determine the interpolation filter having a low-pass filter effect as the interpolation filter for the target sample. Specifically, if the prediction angle of the intra-prediction mode is not smaller than the second specific value, the decoding device may determine the Gaussian filter as the interpolation filter. Alternatively, if the prediction angle of the intra-prediction mode is not smaller than the second specific value, the decoding device may determine the linear filter as the interpolation filter.

Specifically, if the width and height of the current block are equal and the width of the current block is smaller than the first specific value, the decoding device may determine whether the prediction angle of the intra-prediction mode of the current block is smaller than the specific value, and if the prediction angle of the intra-prediction mode is not smaller than the second specific value, the decoding device may determine the Gaussian filter or the linear filter as the interpolation filter.

If the width and height of the current block are different from each other and the intra-prediction mode of the current block is a directional intra-prediction mode having vertical directionality, the decoding device may determine whether the width of the current block is smaller than the first specific value. If the width of the current block is smaller than the first specific value, the decoding device may determine whether a prediction angle of the intra-prediction mode of the current block is smaller than the second specific value. If the prediction angle of the intra-prediction mode is not smaller than the second specific value, the decoding device may determine the Gaussian filter or the linear filter as the interpolation filter.

If the width and height of the current block are different from each other and the intra-prediction mode of the current block is a directional intra-prediction mode having horizontal directionality, the decoding device may determine whether the height of the current block is smaller than the first specific value. If the height of the current block is smaller than the first specific value, the decoding device may determine whether the prediction angle of the intra-prediction mode of the current block is smaller than the second specific value have. If the prediction angle of the intra-prediction mode is not smaller than the second specific value, the decoding device may determine the Gaussian filter or the linear filter as the interpolation filter.

If the width and height of the current block are different from each other and the intra-prediction mode of the current block is a directional intra-prediction mode having vertical directionality, the decoding device may determine whether the height of the current block is smaller than the first specific value. If the height of the current block is smaller than the first specific value, the decoding device may determine whether a prediction angle of the intra-prediction mode of the current block is smaller than the second specific value. If the prediction angle of the intra-prediction mode is not smaller than the second specific value, the decoding device may determine the Gaussian filter or the linear filter as the interpolation filter.

If the width and height of the current block are different from each other and the intra-prediction mode of the current block is a directional intra-prediction mode having horizontal directionality, the decoding device may determine whether the width of the current block is smaller than the first specific value. If the width of the current block is smaller than the first specific value, the decoding device may determine whether the prediction angle of the intra-prediction mode of the current block is not smaller than the second specific value have. If the prediction angle of the intra-prediction mode is smaller than the second specific value, the decoding device may determine the Gaussian filter or the linear filter as the interpolation filter.

Meanwhile, the prediction information for the current block may include information regarding the first specific value and information regarding the second specific value. In this case, the first specific value may be derived based on the information regarding the first specific value and the second specific value may be derived based on the information regarding the second specific value. Alternatively, the first specific value and the second specific value may be derived based on preset values.

In another example, the current block may be divided into a plurality of regions, and an interpolation filter of each region may be determined based on a distance between each region and neighboring samples of the current block. In this case, the interpolation filter for the target sample may be derived as an interpolation filter of a region including the target sample. In addition, if the size of the current block is greater than or equal to a specific size, the current block may be divided into a plurality of regions. Specifically, interpolation filters for the regions closer to the neighboring samples of the current block than a specific value, among the regions, may be determined as sophisticated interpolation filters and interpolation filters for regions farther to the neighboring samples of the current block than the specific value, among the regions, may be determined as interpolation filters having a low pass filter effect.

Meanwhile, the size of the plurality of regions divided from the current block may be preset. Alternatively, the size of the plurality of regions may be derived based on the size of the current block, an intra-prediction mode, or the like. For example, in case that the intra-prediction mode of the current block is one of the intra-prediction modes #35 to #66, the size of the divided regions of the current block may be derived as a 4×4 size. Here, if the current block is a block having a 16×16 size, the current block may be divided into regions having a 4×4 size, a sophisticated interpolation filter may be determined as the interpolation filter for regions from #0 to #7 on a raster scan order and the interpolation filter having a low-pass filter effect may be determined as the interpolation filters for the other regions. For example, interpolation filters for the regions #0 to #7 on the raster scan order, among the regions, may be determined as the cubic filters, and interpolation filters for the other regions may be determined as the Gaussian filters or linear filters. Here, numbers of the 16 regions having the 4×4 size according to the raster scan order may be sequentially derived in order from an upper row to a lower row and sequentially derived in order from the left to the right in each row. That is, regions included in a first row among the 16 regions having the 4×4 size of the current block may be represented as region #0, region #1, region #2, and region #3 in order from the left to the right, regions included in the second row may be represented as region #4, region #5, region #6, and region #7 in order from the left to the right, regions included in the third row may be represented as region #8, region #9, region #10, and region #11 in order from the left and right, and regions included in the fourth row may be represented as region #12, region #13, region #14, and region #15 in order from the left to the right. Meanwhile, prediction information for the current block may be received, and the prediction information may include information indicating a size of each of the divided regions of the current block and information indicating an interpolation filter of each region. In this case, the sizes of the divided regions of the current block and the interpolation filters for the respective regions may be derived based on information indicating sizes of the divided regions of the current block and information indicating the interpolation filters of the respective regions.

In another example, the interpolation filter for the target sample may be determined based on a distance between the target sample and the reference samples. The distance between the target sample and the reference samples may be derived based on the position of the target sample and the prediction angle of the intra-prediction mode of the current block. For example, the distance may be calculated based on the position of the target sample and a trigonometric function value (e.g., tan θ) according to the prediction angle of the intra-prediction mode. Alternatively, the distance may be derived based on a predefined table for the size of the block and the intra-prediction mode. Alternatively, the distance between the target sample and the reference samples may indicate a vertical distance or a horizontal distance. If the distance between the target sample and the reference samples indicates a vertical distance, the distance may be derived based on a y component of the target sample. Also, if the distance between the target sample and the reference samples indicates a horizontal distance, the distance may be derived based on an x component of the target sample.

For example, the decoding device may derive the distance between the target sample and the reference samples and determine whether the distance is smaller than a specific value. If the distance is smaller than the specific value, the decoding device may determine a sophisticated interpolation filter as the interpolation filter for the target sample, and if the distance is not smaller than the specific value, the decoding device may determine the interpolation filter having a low pass filter effect as an interpolation filter for the target sample. Specifically, if the distance is smaller than the specific value, the decoding device may determine a cubic filter as the interpolation filter for the target sample, and if the distance is not smaller than the specific value, the decoding device may determine A Gaussian filter or a linear filter as the interpolation filter for the target sample. The specific value may be derived based on the size of the current block. Alternatively, the specific value may be derived based on the intra-prediction mode of the current block, whether the current block is a square/non-square block, or the like. For example, when the size of the current block is N×N, the specific value may be derived as N/2. Also, prediction information for the current block may be received, and the prediction information may include information regarding the specific value. In this case, the specific value may be derived based on the information regarding the specific value.

In another example, a plurality of interpolation filters may be determined as the interpolation filters for the target sample. For example, the interpolation filters for the target sample may include one of sophisticated interpolation filters and one of interpolation filters having a low-pass filter effect. Alternatively, the interpolation filters for the target sample may include one of the sophisticated interpolation filters and two of the interpolation filters having a low-pass filter effect. Alternatively, the interpolation filters for the target sample may include two of sophisticated interpolation filters and one of interpolation filters having a low-pass filter effect. Specifically, the interpolation filters for the target sample may include a cubic filter and a Gaussian filter. Meanwhile, prediction information for the current block may be received, and the prediction information may include a flag indicating whether a plurality of interpolation filters are determined as the interpolation filters for the target sample. Whether the plurality of interpolation filters are determined may be determined based on the flag. For example, when the flag indicates that a plurality of interpolation filters are determined as the interpolation filters for the target sample, the prediction sample for the target sample may be derived based on the plurality of interpolation filters, and when the flag indicates that a plurality of interpolation filters are not determined as the interpolation filters for the target sample, the prediction sample for the target sample may not be derived based on the plurality of interpolation filters. For example, when a value of the flag is 1, the flag may indicate that a plurality of interpolation filters are determined as the interpolation filters for the target sample, and when the value of the flag is 0, the flag may indicate that a plurality of interpolation filters are not determined as the interpolation filters for the target sample.

The decoding device derives a prediction sample of the target sample based on the interpolation filter and the reference samples (S1440). The decoding device may derive filter coefficients of the interpolation filter based on the position of the target sample and the prediction angle of the intra-prediction mode and derive the prediction sample of the target sample based on the filter coefficients and the reference samples. For example, four neighboring samples among the neighboring samples of the current block may be derived as the reference samples, and four filter coefficients of the interpolation filter may be derived. The decoding device may interpolate the reference samples based on the filter coefficients to derive the prediction sample. The prediction sample may be derived based on Equation 1 described above.

Further, when a plurality of interpolation filters are determined as the interpolation filters for the target sample, the decoding device may derive (temporary) prediction samples based on each interpolation filter and derive the prediction sample of the target sample based on the derived (temporary) prediction sample. For example, the prediction sample of the target sample may be derived by averaging the (temporal) prediction samples or may be derived by weighted-summing the (temporal) prediction samples. Whether a plurality of interpolation filters are determined as the interpolation filter for the target sample may be derived based on the size of the current block, an intra-prediction mode of the current block, a variance of neighboring sample values of the current block, and the like. In addition, a flag indicating whether a plurality of interpolation filters are determined as the interpolation filters for the target sample may be received, and whether the plurality of interpolation filters are determined as the interpolation filters for the target sample may be determined based on the flag.

For example, the interpolation filters for the target sample may include a cubic filter and a Gaussian filter. In this case, the decoding device may derive filter coefficients of the cubic filter based on the position of the target sample and the prediction angle of the intra-prediction mode and may derive filter coefficients of the Gaussian filter based on the position of the target sample and the prediction angle of the intra-prediction mode. The decoding device may derive a first prediction sample for the target sample based on the filter coefficients of the cubic filter and the reference samples, derive a second prediction sample for the target sample based on the filter coefficients of the Gaussian filter and the reference samples, and derive the prediction sample of the target sample based on the first prediction sample and the second prediction sample. The prediction sample of the target sample may be derived by averaging the first prediction sample and the second prediction sample. Alternatively, the prediction sample of the target sample may be derived by weighted-summing the first prediction sample and the second prediction sample. In this case, a weight for the first prediction sample may be in inverse proportion to the distance between the target sample and the reference samples and a weight for the second prediction sample may be derived as a value obtained by subtracting the weight for the first prediction sample from 1. Alternatively, the first weight and the second weight used here may be up-scaled in units of integers and derived to avoid a decimal point calculation.

Also, for example, the interpolation filters for the target sample may include a cubic filter and a linear filter. In this case, the decoding device may derive filter coefficients of the cubic filter based on the position of the reference sample and may derive filter coefficients of the linear filter based on the position of the reference sample. The decoding device may derive a first prediction sample for the target sample based on the filter coefficients of the cubic filter and the reference samples, derive a second prediction sample for the target sample based on the filter coefficients of the linear filter and the reference samples, and derive the prediction sample of the target sample based on the first prediction sample and the second prediction sample. The prediction sample of the target sample may be derived by averaging the first prediction sample and the second prediction sample. Alternatively, the prediction sample of the target sample may be derived by weighted-summing the first prediction sample and the second prediction sample. In this case, a weight for the first prediction sample may be in inverse proportion to the distance between the target sample and the reference samples and a weight for the second prediction sample may be derived as a value obtained by subtracting the weight for the first prediction sample from 1. Alternatively, the first weight and the second weight used here may be up-scaled in units of integers and derived to avoid a decimal point calculation.

In another example, if an MPM (most probable mode) mode is applied to the current block to derive an intra-prediction mode of the current block based on an intra-prediction mode of a neighboring block of the current block and the intra-prediction mode of the current block is a directional intra-prediction mode, rather than a planar mode or a DC mode, an interpolation filter for the target sample may be determined based on the neighboring blocks selected through the neighboring MPM mode. That is, the interpolation filter used in the neighboring block may be derived as an interpolation filter for the target sample. If the MPM mode is applied to the current block, the decoding device may determine an MPM list based on an intra-prediction mode for a left or upper neighboring block of the current block and determine the intra-prediction mode based on the MPM list.

Although not shown in the figure, the decoding device may use the prediction sample as a reconstructed sample according to a prediction mode or add a residual sample to the prediction sample to generate a reconstructed sample. When there is a residual sample for the target block, the decoding device may receive information regarding the residual for the target block, and the information regarding the residual may be included in the information regarding the reconstructed sample. The information regarding the residual may include a transform coefficient related to the residual sample. The decoding device may derive the residual sample (or residual sample arrays) for the target block based on the residual information. The decoding device may generate a reconstructed sample based on the prediction sample and the residual sample and may derive a reconstructed block or a reconstructed picture based on the reconstructed sample. Thereafter, in order to enhance subjective/objective image quality as necessary, the decoding device may apply an in-loop filtering procedure such as deblocking filtering and/or SAO procedure to the reconstructed picture, as described above.

In addition, the decoding device may receive the prediction information for the current block through a bitstream and may entropy-decode the same. The prediction information may include information on the intra-prediction mode of the current block. The decoding device may obtain information regarding the intra-prediction mode indicating the intra-prediction mode. The intra-prediction mode information may include information directly indicating an intra-prediction mode for the current block or may include information indicating any one candidate in an infra prediction mode candidate list derived based on an intra-prediction mode of a left or upper block of the current block. The intra-prediction mode candidate list may indicate the MPM list.

In addition, when the current block is divided into a plurality of regions, the prediction information may include information indicating a size of the divided regions of the current block and an interpolation filter of each region. In addition, when the interpolation filter for the target sample is selected based on the size of the current block, the intra-prediction mode of the current block, or the distance between the target sample and the reference samples, the prediction information may include information regarding the specific value used for selecting the interpolation filter for the target sample. When the interpolation filter is selected based on the size of the current block and the intra-prediction mode of the current block, the prediction information may include information regarding a first specific value and information regarding a second specific value. Also, the prediction information may include a flag indicating whether a plurality of interpolation filters are determined as the interpolation filters for the target sample. When the flag indicates that a plurality of interpolation filters are determined as the interpolation filters for the target sample, a prediction sample of the target sample may be derived based on the plurality of interpolation filters, and when the flag indicates that a plurality of interpolation filters are not determined as the interpolation filters for the target sample, a prediction sample of the target sample may not be derived based on the plurality of interpolation filters. For example, when a value of the flag is 1, the flag may indicate that a plurality of interpolation filters are determined as the interpolation filters for the target sample, and when the value of the flag is 0, the flag may indicate that a plurality of interpolation filters are not determined as the interpolation filters for the target sample. The prediction information may be signaled through a video parameter set (VPS), a sequence parameter set (SPS), a picture parameter set (PPS), or a slice segment header or may be signaled on a block basis.

According to the present disclosure described above, prediction may be performed on the target sample based on the interpolation filter derived according to the size of the current block, the distance between the target sample and the reference sample, and/or the prediction mode (prediction angle), whereby the reference sample of the fractional sample position for the target sample may be accurately generated to enhance prediction accuracy for the current block and the residual for the current block may be reduced to enhance coding efficiency.

Also, according to the present disclosure, since an interpolation filter for the target sample may be selected based on various conditions described above, the amount of bits of information on the selection of the interpolation filter may be reduced, whereby prediction accuracy for the current block may be enhanced and coding efficiency of the current block may be enhanced.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The method according to the present disclosure described above may be implemented in software. The encoding device and/or decoding device according to the present disclosure may be included in a device that performs image processing, for example, for a TV, a computer, a smart phone, a set-top box, or a display device.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An video decoding method performed by a decoding device, the method comprising:
    deriving an intra-prediction mode of a current block, wherein the intra-prediction mode is one of directional intra prediction modes with a prediction angle greater than 0;
    deriving neighboring samples including left neighboring samples and upper neighboring samples of the current block;
    deriving reference samples for prediction of a target sample of the current block among the neighboring samples based on a position of the target sample and a prediction angle of the intra-prediction mode;
    determining an interpolation filter for the target sample based on the intra-prediction mode and a size of the current block, wherein the interpolation filter is determined as one of a Gaussian filter and a cubic filter; and
    deriving a prediction sample of the target sample based on the interpolation filter and the reference samples,
    wherein when the size of the current block is greater than or equal to a first specific value, the interpolation filter for the target sample is derived as the Gaussian filter, and
    wherein when the size of the current block is smaller than the first specific value, the interpolation filter for the target sample is derived based on the intra-prediction mode and a second specific value.

2. The video decoding method of claim 1, wherein
    the deriving of a prediction sample of the target sample based on the interpolation filter and the reference samples comprises:
    deriving filter coefficients of the interpolation filter based on the position of the target sample and the prediction angle; and
    deriving the prediction sample of the target sample based on the filter coefficients and the reference samples.

3. The video decoding method of claim 1, wherein
    when a width and a height of the current block are equal, the size of the current block is set equal to the width of the current block.

4. The video decoding method of claim 1, wherein
    when a width and a height of the current block are different and the intra-prediction mode of the current block is a directional intra-prediction mode having vertical directionality, the size of the current block is set equal to the width of the current block.

5. The video decoding method of claim 1, wherein
    when a width and a height of the current block are different and the intra-prediction mode of the current block is a directional intra-prediction mode having horizontal directionality, the size of the current block is set equal to the height of the current block.

6. The video decoding method of claim 1, wherein
    when the size of the current block is smaller than the first specific value, it is determined whether the prediction angle of the intra-prediction mode of the current block is smaller than the second specific value, and
    when the prediction angle of the intra-prediction mode is smaller than the second specific value, the interpolation filter for the target sample is derived as a cubic filter, and
    when the prediction angle of the intra-prediction mode is not smaller than the second specific value, the interpolation filter for the target sample is derived as a Gaussian filter.

7. An video encoding method performed by an encoding device, the method comprising:
    determining an intra-prediction mode of a current block, wherein the intra-prediction mode is one of directional intra prediction modes with a prediction angle greater than 0;
    deriving neighboring samples including left neighboring samples and upper neighboring samples of the current block;
    deriving reference samples for prediction of a target sample of the current block among the neighboring samples based on a position of the target sample and a prediction angle of the intra-prediction mode;
    determining an interpolation filter for the target sample based on the intra-prediction mode and a size of the current block, wherein the interpolation filter is determined as one of a Gaussian filter and a cubic filter;
    deriving a prediction sample of the target sample based on the interpolation filter and the reference samples; and
    encoding video information comprising prediction information for the current block,
    wherein when the size of the current block is greater than or equal to a first specific value, the interpolation filter for the target sample is derived as the Gaussian filter, and
    wherein when the size of the current block is smaller than the first specific value, the interpolation filter for the target sample is derived based on the intra-prediction mode and a second specific value.

8. A non-transitory computer-readable storage medium storing video information, the video information, when executed, causing a decoding apparatus to perform the following steps:
    deriving an intra-prediction mode of a current block, wherein the intra-prediction mode is one of directional intra prediction modes with a prediction angle greater than 0;

deriving neighboring samples including left neighboring samples and upper neighboring samples of the current block;

deriving reference samples for prediction of a target sample of the current block among the neighboring samples based on a position of the target sample and a prediction angle of the intra-prediction mode;

determining an interpolation filter for the target sample based on the intra-prediction mode and a size of the current block, wherein the interpolation filter is determined as one of a Gaussian filter and a cubic filter; and deriving a prediction sample of the target sample based on the interpolation filter and the reference samples, wherein when the size of the current block is greater than or equal to a first specific value, the interpolation filter for the target sample is derived as the Gaussian filter, and wherein when the size of the current block is smaller than the first specific value, the interpolation filter for the target sample is derived based on the intra-prediction mode and a second specific value.

\* \* \* \* \*